(12) United States Patent  
Imao

(10) Patent No.: US 9,178,599 B2
(45) Date of Patent: Nov. 3, 2015

(54) DIVERSITY RECEIVING DEVICE AND DIVERSITY RECEIVING METHOD

(71) Applicant: MITSUBISHI ELECTRIC CORPORATION, Tokyo (JP)

(72) Inventor: Masataka Imao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/430,314

(22) PCT Filed: Jul. 17, 2013

(86) PCT No.: PCT/JP2013/069362
§ 371 (c)(1),
(2) Date: Mar. 23, 2015

(87) PCT Pub. No.: WO2014/087694
PCT Pub. Date: Jun. 12, 2014

(65) Prior Publication Data
US 2015/0288440 A1   Oct. 8, 2015

(30) Foreign Application Priority Data
Dec. 7, 2012  (JP) ................. 2012-268156

(51) Int. Cl.
*H04B 7/10* (2006.01)
*H04L 1/02* (2006.01)
(Continued)

(52) U.S. Cl.
CPC .. *H04B 7/08* (2013.01); *H04B 7/12* (2013.01); *H04B 15/00* (2013.01)

(58) Field of Classification Search
CPC ............ H04B 7/08; H04B 7/12; H04B 15/00; H04B 7/084; H04B 7/0851; H04B 7/0842; H04B 1/28; H04B 7/0854
USPC ................. 375/267, 347; 343/712; 455/160.1
See application file for complete search history.

(56) References Cited

U.S. PATENT DOCUMENTS 4,850,037 A * 7/1989 Bochmann ........... H04B 7/0851
                                                          343/712
5,321,850 A * 6/1994 Backstrom ............ H03J 1/0008
                                                          375/267
(Continued)

FOREIGN PATENT DOCUMENTS

EP       1 858 169 A1    11/2007
EP       1 883 169 A1    1/2008
(Continued)

OTHER PUBLICATIONS

Saunders., "Antennas and propagation for wireless communication systems," John Wiley & Sons, Ltd, 1999, pp. 332-339.

*Primary Examiner* — Phuong Phu
(74) *Attorney, Agent, or Firm* — Birch, Stewart, Kolasch & Birch, LLP

(57) ABSTRACT

A diversity receiving device includes receiving circuits, a diversity combining unit, and an oscillation controller. The receiving circuit performs frequency conversion of an analog received signal obtained at a first receiving system, by using a plurality of lower-side oscillation-frequency signals supplied from a first local oscillator, to generate a plurality of lower-side low-frequency signals, adds up the plurality of lower-side low-frequency signals to generate a first addition signal. The receiving circuit performs frequency conversion of an analog received signal obtained at a second receiving system, by using a plurality of higher-side oscillation-frequency signals supplied from a second local oscillator, to generate a plurality of higher-side low-frequency signals, and adds up the plurality of higher-side low-frequency signals to generate a second addition signal. The oscillation controller controls lower-side oscillation-frequencies so that frequency bands of the plurality of lower-side low-frequency signals become adjacent to one another and controls higher-side oscillation-frequencies so that frequency bands of the plurality of higher-side low-frequency signals become adjacent to one another.

10 Claims, 16 Drawing Sheets

(51) Int. Cl.
*H04B 7/08* (2006.01)
*H04B 7/12* (2006.01)
*H04B 15/00* (2006.01)

(56) References Cited

U.S. PATENT DOCUMENTS

| | | | |
|---|---|---|---|
| 6,029,056 A | 2/2000 | Kiyanagi et al. | |
| 8,494,471 B2* | 7/2013 | Takeuchi | H04B 1/28 375/260 |
| 8,908,817 B1* | 12/2014 | Rydstrom | H04B 7/084 375/144 |
| 2006/0256884 A1 | 11/2006 | Tomioka et al. | |
| 2009/0075611 A1* | 3/2009 | Wada | H04N 5/50 455/160.1 |
| 2009/0304118 A1* | 12/2009 | Yuanzhu | H04B 7/0854 375/340 |
| 2010/0189202 A1* | 7/2010 | Imao | H04B 7/0842 375/344 |

FOREIGN PATENT DOCUMENTS

| | | |
|---|---|---|
| JP | 10-322255 A | 12/1998 |
| JP | 11-205261 A | 7/1999 |
| JP | 2001-7780 A | 1/2001 |
| JP | 2006-86869 A | 3/2006 |
| JP | 2006-262179 A | 9/2006 |
| JP | 2006-319537 A | 11/2006 |
| JP | 3956828 B2 | 8/2007 |
| JP | 2007-312389 A | 11/2007 |
| JP | 2009-290854 A | 12/2009 |
| JP | 2010-183257 A | 8/2010 |
| JP | 2010-239330 A | 10/2010 |
| JP | 2012-191266 A | 10/2012 |
| WO | WO 2006/137382 A1 | 12/2006 |

* cited by examiner

DIVERSITY RECEIVING DEVICE AND DIVERSITY RECEIVING METHOD

TECHNICAL FIELD

The present invention relates to a diversity receiving technique for combining a plurality of received signals, in particular, a diversity receiving technique capable of efficiently suppressing unwanted signals included in the plurality of received signals.

BACKGROUND ART

Diversity receiving techniques are techniques for improving the quality of communication by combining a plurality of received signals received by a plurality of receiving systems respectively. By the diversity receiving techniques, time-selective, space-selective, or frequency-selective fading (waveform distortion) can be compensated.

As combining methods in the diversity receiving techniques, for example, the following methods are known: a selection combining method in which a received signal having the highest signal level or SNR (signal-to-noise ratio) is selected among a plurality of received signals; an equal-gain combining method in which phases of a plurality of received signals are adjusted so as to make all of them the same phase and then the sum total of the received signals is outputted; and a maximal-ratio combining method in which phases and amplitudes of a plurality of received signals are adjusted and then the sum total of the received signals is outputted. In the maximal-ratio combining method, amplitude adjustment is executed by weighting the received signals so as to maximize the SNR of the combined output. These combining methods are disclosed in non-patent reference 1 indicated below, for example. Non-patent reference 1 discloses a technique for reducing thermal noise by the diversity effect obtained by combining the signals, by using the characteristic that thermal noise at different receiving antenna systems are mutually uncorrelated. Non-patent reference 1 also shows the diversity effect quantitatively.

In various nations of the world, digitization of broadcasting has been developed widely, and in parallel, it has become common for various receivers such as home television receivers, vehicle-mounted broadcast receivers, and mobile information terminals, to have a digital broadcast reception function. As reception styles have been diversified, in addition to a television broadcasting service and a radio broadcasting service, a new type of broadcasting services which is a combination of features of those two services have been started actually. This trend is expected to cause a surge in the number of digital broadcast channels.

Further, broadcast reception techniques have been increasingly sophisticated in recent years, and highly functional digital broadcast receivers have been spreading in a large scale. Some functions have already been put to practical use: an automatic selection function to select broadcast programs that match preferences of viewers, and functions of simultaneous multiple-channel reception and recording, for example. On the other hand, vehicle-mounted broadcast receivers have begun to utilize automatic reception-area switching techniques for seamless reception and techniques for stable broadcast reception in environments where reception is difficult. The sophistication of digital broadcast receivers for higher functions is expected in any form of reception.

In particular, the simultaneous multiple-channel reception function is one of indispensable techniques for sophisticating the reception function to keep up with diversifying both broadcasting and reception styles. Accordingly, a variety of reception schemes have been studied in recent years in relation to the simultaneous multiple-channel reception function.

Simultaneous multiple-channel reception can be implemented easily by incorporating tuners, the number of which is the same as the number of channels needed for simultaneous reception, in a digital broadcast receiver. Each of the tuners has an analog front-end unit that converts an RF (radio frequency) signal in a high-frequency band to a low-frequency signal in a lower frequency band (such as an IF signal in an intermediate frequency band) by using an oscillation signal generated by a local oscillator. The plurality of tuners concurrently output a plurality of low-frequency signals corresponding to the multiple channels. It is, however, uneconomical to incorporate the plurality of tuners into the digital broadcast receiver for the simultaneous multiple channel reception, since the number of analog components required in the analog front-end unit increases as the number of channels increases.

It has been suggested to incorporate a plurality of frequency converters, the number of which is the same as the number of channels needed for simultaneous reception, and a signal adder into a single tuner. Such type of tuner is disclosed in Japanese Patent Application Publication No. 2001-007780 (patent reference 1), for example.

In the tuner disclosed in patent reference 1, the plurality of frequency converters convert an RF signal to a plurality of IF (intermediate-frequency) signals corresponding to the plurality of channels, by using a plurality of oscillation signals having oscillation-frequencies which are different from one another. A signal adder adds the plurality of IF signals together to output them. Here, the oscillation-frequencies are adjusted so that the channels (frequency bands) of IF signal components do not overlap one another in the output frequency spectrum of the signal adder. Thus, the tuner can then process the plurality of IF signals obtained by frequency conversion as signals of a single channel, and the number of analog components can be reduced. Since the analog output of the signal adder can be converted to a digital signal by a single A/D converter, a cost advantage can be gained, for example.

PRIOR ART REFERENCES

Patent Reference

Patent reference 1: Japanese Patent Application Publication No. 2001-007780 (Paragraph 0019 and FIG. 1, etc.)
Patent reference 2: Japanese Patent Publication No. 3956828 (Paragraph 0010 and FIG. 1, etc.)

Non-Patent Reference

Non-patent reference 1: Simon R. Saunders, "Antennas and propagation for wireless communication systems", John Wiley & Sons. Ltd., 1999, pp. 332-339.

SUMMARY OF THE INVENTION

Problems to be Solved by the Invention

In the conventional art disclosed in patent reference 1, an unwanted signal superposed on the received signal sometimes causes degradation in signal quality. Examples of the unwanted signal are thermal noise generated in the receiver and an interference signal entering the receiver from the outside. As for thermal noise, signals received at a plurality of systems are combined by using a diversity receiver, and thus it is possible to reduce thermal noise easily and efficiently.

In some cases, however, the interference signal coming from the outside has a strong correlation in the plurality of receiving systems of the diversity receiver. In that case, it is difficult for the conventional diversity receiver to suppress efficiently the interference signal superposed on the received signal.

FIGS. 1A to 1D are diagrams schematically showing frequency spectra for explaining the problem. FIG. 1A is a diagram showing an example of the frequency spectrum of an RF signal. By using the conventional technique disclosed in patent reference 1 mentioned above, frequency conversion can be performed on the RF signal having the frequency spectrum as shown in FIG. 1A to obtain two IF signals, and an addition signal can be generated by adding the two IF signals. FIG. 1B is a diagram schematically showing the frequency spectrum of one IF signal of the signals converted into the IF band; FIG. 1C is a diagram schematically showing the frequency spectrum of the other IF signal of the signals converted into the IF band; FIG. 1D is a diagram schematically showing the frequency spectrum of the addition signal obtained by adding up the IF signals shown in FIGS. 1B and 1C.

As shown in FIG. 1A, the RF signal contains channel components (desired signal components) CHA and CHB separated from each other on the frequency-axis, unwanted signal components NA1, NA2, PA1 and PA2 are present in the vicinity of the both sides of the channel component CHA, and unwanted signal components NB1, NB2, PB1 and PB2 are present in the vicinity of the both sides of the other channel component CHB. A channel component CHa and unwanted signal components Na1, Na2, Pa1 and Pa2 in the IF band in FIG. 1B are obtained by frequency conversion on the channel component CHA and unwanted signal components NA1, NA2, PA1 and PA2 in the RF band in FIG. 1A. Further, a channel component CHb and unwanted signal components Nb1, Nb2, Pb1 and Pb2 in the IF band in FIG. 1C are obtained by frequency conversion on the channel component CHB and unwanted signal components NB1, NB2, PB1 and PB2 in the RF band shown in FIG. 1A. As shown in FIG. 1D, in the addition signal, the unwanted signal component Nb1 interferes with the channel component CHa, and the unwanted signal component Pa1 interferes with the channel component CHb. This causes a problem that the signal quality is degraded and therefore the reception performance is degraded.

As a method of suppressing the interference signal, an equalization method of reducing interference signal components (disturbance wave components) from a received signal by using a received known signal such as a pilot carrier included in the received signal has been proposed (Japanese Patent Publication No. 3956828: Patent reference 2, for example).

However, as described above, since a variety of functions and applications are expected to be incorporated into next-generation digital broadcast receivers, it can be easily presumed that a combination of target channels for simultaneous reception and a combination of desired signals and unwanted signals are quite complicated. Further, since digital broadcasting is performed in accordance with a variety of broadcast standards, the presence or absence of a known signal, the manner of inserting a known signal into a transmission signal, the modulation method and the like may vary greatly depending on the broadcast standards. The equalization method using the received known signal depends on the signal format (transmission signal format) specified by the broadcast standard. Therefore, quite complicated algorithms are needed for implementing the equalization method which supports several types of signal formats and improves the reception performance.

In view of the above description, an object of the present invention is to provide a diversity receiving device and a diversity receiving method capable of suppressing unwanted signals efficiently, independently of signal formats specified by broadcast standards.

Means for Solving the Problem

A diversity receiving device according to one aspect of the present invention is a device for receiving, at a first receiving system and a second receiving system, a transmission signal containing first to K-th high-frequency-channel components which have mutually different first to K-th central frequencies respectively, where K is an integer not less than 2. The diversity receiving device includes: a first receiving circuit for receiving, as an input, a first analog received signal obtained at the first receiving system is input; a second receiving circuit for receiving, as an input, a second analog received signal obtained at the second receiving system is input; a diversity combining unit for combining an output of the first receiving circuit and an output of the second receiving circuit for each same frequency component; and an oscillation controller.

The first receiving circuit includes: a first local oscillator that supplies first to K-th lower-side oscillation-frequency signals having first to K-th lower-side oscillation-frequencies respectively, the first to K-th lower-side oscillation-frequencies shifted respectively toward lower frequency sides of the first to K-th central frequencies respectively; a first frequency converter that performs frequency conversion of the first analog received signal by using the first to K-th lower-side oscillation-frequency signals, thereby generating first to K-th lower-side low-frequency signals corresponding to the first to K-th lower-side oscillation-frequencies respectively; a first signal adder that adds up the first to K-th lower-side low-frequency signals, thereby generating a first addition signal; a first channel-component extractor that extracts, from the first addition signal, first to K-th lower-side low-frequency-channel components corresponding to the first to K-th high-frequency-channel components respectively; and a first channel signal processor that performs signal processing of the first to K-th lower-side low-frequency-channel components, thereby generating first to K-th lower-side low-frequency-channel processing signals corresponding to the first to K-th lower-side low-frequency-channel components respectively, which are output the diversity combining unit.

The second receiving circuit includes: a second local oscillator that supplies first to K-th higher-side oscillation-frequency signals having first to K-th higher-side oscillation-frequencies respectively, the first to K-th higher-side oscillation-frequencies shifted respectively toward higher frequency sides of the first to K-th central frequencies respectively; a second frequency converter that performs frequency conversion of the second analog received signal by using the first to K-th higher-side oscillation-frequency signals, thereby generating first to K-th higher-side low-frequency signals corresponding to the first to K-th higher-side oscillation-frequencies respectively; a second signal adder that adds up the first to K-th higher-side low-frequency signals, thereby generating a second addition signal; a second channel-component extractor that extracts, from the second addition signal, first to K-th higher-side low-frequency-channel components corresponding to the first to K-th high-frequency-channel components respectively; and a second channel signal processor that performs signal processing of the first to K-th higher-side low-frequency-channel components, thereby generating first to K-th higher-side low-frequency-channel processing signals corresponding to the first to K-th higher-side low-frequency-channel components respectively, and outputs the first to K-th higher-side low-frequency-channel processing signals to the diversity combining unit.

The oscillation controller controls the first to K-th lower-side oscillation-frequencies so that frequency bands of the first to K-th lower-side low-frequency signals become adjacent to one another and controls the first to K-th higher-side oscillation-frequencies so that frequency bands of the first to K-th higher-side low-frequency signals become adjacent to one another.

A diversity receiving method according to another aspect of the present invention is a method for receiving, at a first receiving system and a second receiving system, a transmission signal containing first to K-th high-frequency-channel components which have mutually different first to K-th central frequencies respectively, K is an integer not less than 2. The diversity receiving method includes the steps of: obtaining a first analog received signal and a second analog received signal from the first receiving system and the second receiving system respectively; performing frequency conversion of the first analog received signal by using first to K-th lower-side oscillation-frequency signals having first to K-th lower-side oscillation-frequencies respectively, the first to K-th lower-side oscillation-frequencies shifted respectively toward lower frequency sides of the first to K-th central frequencies respectively, thereby generating first to K-th lower-side low-frequency signals corresponding to the first to K-th lower-side oscillation-frequencies respectively; adding up the first to K-th lower-side low-frequency signals, thereby generating a first addition signal; extracting, from the first addition signal, first to K-th lower-side low-frequency-channel components corresponding to the first to K-th high-frequency-channel components respectively; performing signal processing of the first to K-th lower-side low-frequency-channel components, thereby generating first to K-th lower-side low-frequency-channel processing signals corresponding to the first to K-th lower-side low-frequency-channel components respectively; performing frequency conversion of the second analog received signal by using first to K-th higher-side oscillation-frequency signals having first to K-th higher-side oscillation-frequencies respectively, the first to K-th higher-side oscillation-frequencies shifted respectively toward higher frequency sides of the first to K-th central frequencies, thereby generating first to K-th higher-side low-frequency signals corresponding to the first to K-th higher-side oscillation-frequencies respectively; adding up the first to K-th higher-side low-frequency signals, thereby generating a second addition signal; extracting, from the second addition signal, first to K-th higher-side low-frequency-channel components corresponding to the first to K-th high-frequency-channel components respectively; performing signal processing of the first to K-th higher-side low-frequency-channel components, thereby generating first to K-th higher-side low-frequency-channel processing signals corresponding to the first to K-th higher-side low-frequency-channel components respectively; and combining the first to K-th lower-side low-frequency-channel processing signals and the first to K-th higher-side low-frequency-channel processing signals for each same frequency component. The first to K-th lower-side oscillation-frequencies are controlled so that frequency bands of the first to K-th lower-side low-frequency signals become adjacent to one another, and the first to K-th higher-side oscillation-frequencies are controlled so that frequency bands of the first to K-th higher-side low-frequency signals become adjacent to one another.

Effects of the Invention

According to the present invention, first to K-th higher-side low-frequency signals forming a first addition signal are generated as a result of frequency conversion using first to K-th higher-side oscillation-frequencies shifted toward higher frequency sides of central frequencies of first to K-th high-frequency-channel components respectively, and first to K-th lower-side low-frequency signals forming a second addition signal are generated as a result of frequency conversion using first to K-th lower-side oscillation-frequencies shifted toward lower frequency sides of the central frequencies of the first to K-th high-frequency-channel components respectively. Accordingly, frequency positions (positions in a frequency domain) of mutually highly correlated unwanted signal components that have been put into a first receiving system and a second receiving system can be placed to be different from one another. This can be executed without changing frequency positions of desired signal components. Accordingly, by combining the first to K-th higher-side low-frequency-channel processing signals and the first to K-th lower-side low-frequency-channel processing signals for each same frequency component, the unwanted signal components can be cancelled each other out. Therefore, the unwanted signal components can be suppressed effectively, independently of signal formats specified by broadcast standards.

MODE FOR CARRYING OUT THE INVENTION

Various embodiments for realizing a diversity receiving method according to the present invention will be described below with reference to the drawings.

First Embodiment

Figure 1:
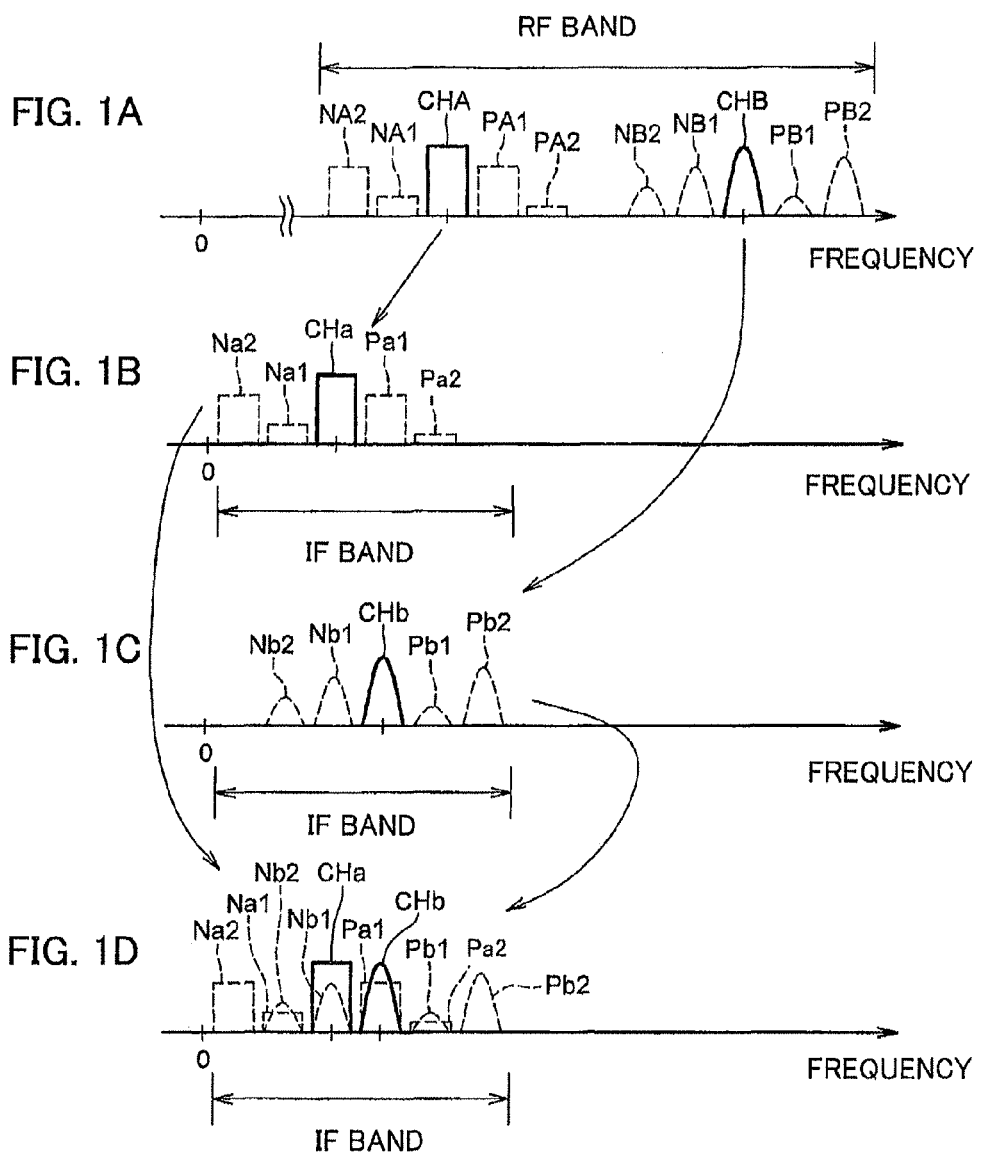
FIG. 1A is a diagram schematically showing a frequency spectrum of an RF signal.
FIGS. 1B to 1D are diagrams schematically showing frequency spectra of IF signals.
Figure 2:
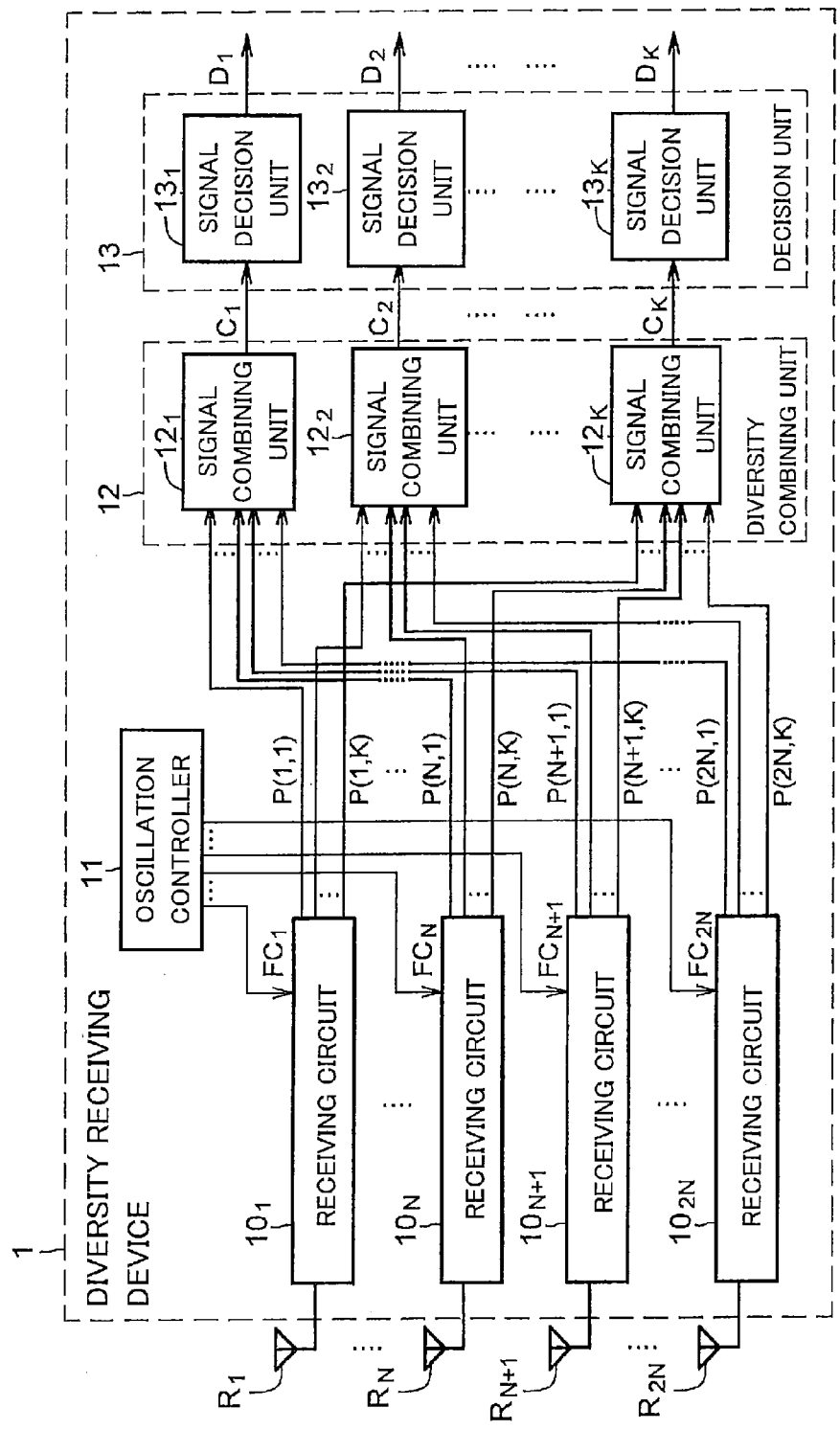
FIG. 2 is a functional block diagram showing a configuration of a diversity receiving device according to a first embodiment of the present invention.

FIG. 2 is a block diagram showing a schematic configuration of a diversity receiving device 1 in the first embodiment. As shown in FIG. 2, the diversity receiving device 1 includes: receiving antenna elements $R_1, \ldots, R_{2N}$ that forms (2×N) independent receiving systems (N is an integer not less than 2); receiving circuits $10_1, \ldots, 10_{2N}$ that receive transmission signals through the receiving antenna elements $R_1, \ldots, R_{2N}$ respectively; an oscillation controller 11 that controls individually oscillation-frequencies of oscillation signals used in the receiving circuits $10_1$ to $10_{2N}$; a diversity combining unit 12 that combines outputs P(1, 1) to P(2N, K) (K is an integer not less than 2) of the receiving circuits $10_1$ to $10_{2N}$ for each same frequency component; and a decision unit 13 that decides signal points of combined outputs $C_1, \ldots, C_K$ of the diversity combining unit 12.

The oscillation controller 11 supplies the receiving circuits $10_1$ to $10_{2N}$ with frequency control signals $FC_1, \ldots, FC_{2N}$ for controlling the oscillation-frequencies of oscillation signals used by the receiving circuits $10_1$ to $10_{2N}$ respectively.

Figure 3:
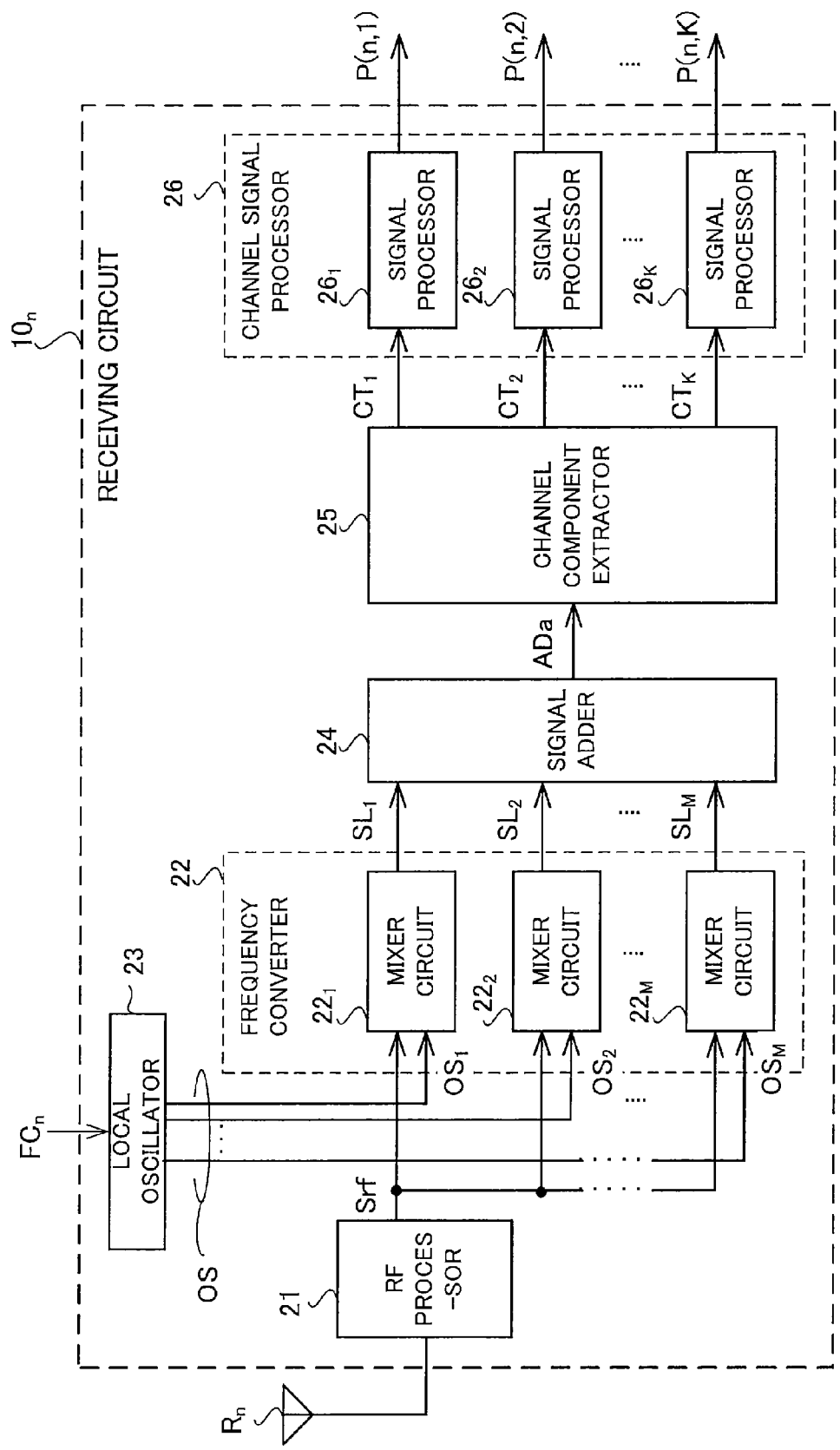
FIG. 3 is a functional block diagram showing a configuration of a receiving circuit for forming the diversity receiving device in the first embodiment.

The receiving circuits $10_1$ to $10_{2N}$ have the same basic configuration. FIG. 3 is a block diagram showing a schematic configuration of the n-th receiving circuit $10_n$. The receiving circuit $10_n$ includes an RF processor 21 that receives the transmission signal through the receiving antenna element $R_n$, a frequency converter 22 that performs frequency conversion of the output (analog received signal) of the RF processor 21, a local oscillator 23, a signal adder 24, a channel-component extractor 25, and a channel signal processor 26.

The RF processor 21 includes a group of analog elements that performs RF signal processing, such as a bandpass filter and a signal amplifier. The RF processor 21 can output an analog RF signal Srf containing high-frequency-channel components in all the frequency bands to be received simultaneously, from the received signal. In this embodiment, the RF processor 21 outputs the analog RF signal Srf containing M high-frequency-channel components (M is an integer not less than 2).

Figure 4:
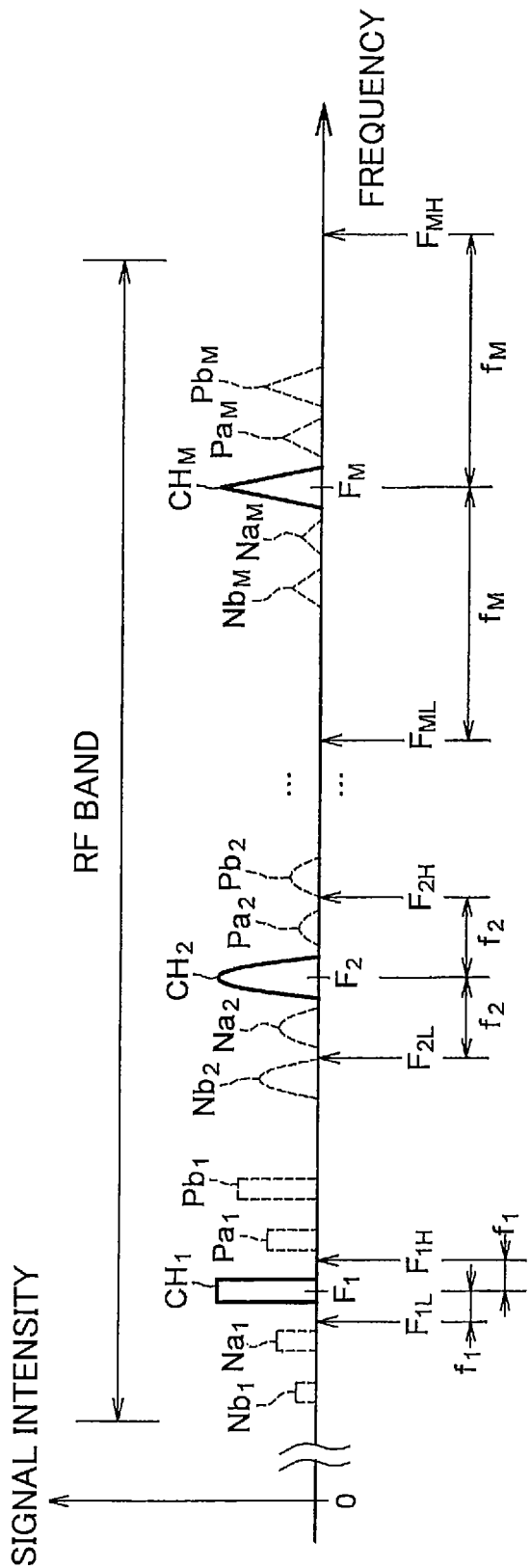
FIG. 4 is a diagram schematically showing an example of a frequency spectrum of an analog RF signal.

FIG. 4 is a diagram schematically showing an example of the frequency spectrum of the analog RF signal Srf. As shown in FIG. 4, in the RF band, the analog RF signal Srf contains M high-frequency-channel components $CH_1, CH_2, \ldots, CH_M$ which have central frequencies $F_1, F_2, \ldots, F_M$ respectively, which differ from each other. In the example shown in FIG. 4, unwanted signal components $Pa_1, Pb_1, Na_1$ and $Nb_1$ are present in the vicinity of the high-frequency-channel component $CH_1$, unwanted signal components $Pa_2, Pb_2, Na_2$ and $Nb_2$ are present in the vicinity of the high-frequency-channel component $CH_2$, and unwanted signal components $Pa_M, Pb_M, Na_M$ and $Nb_M$ are present in the vicinity of the high-frequency-channel component $CH_M$.

The local oscillator 23 supplies the frequency converter 22 with a group of local oscillation signals OS having oscillation-frequencies specified by the frequency control signal $FC_n$. The group of local oscillation signals OS includes M local oscillation signals $OS_1$ to $OS_M$. In N receiving circuits $10_1$ to $10_N$ among the (2×N) receiving circuits $10_1$ to $10_{2N}$, as shown in FIG. 4, the frequencies of the local oscillation signals $OS_1, OS_2, \ldots, OS_M$ are set to lower-side oscillation-frequencies $F_{1L}, F_{2L}, \ldots, F_{ML}$ respectively. The lower-side oscillation-frequencies $F_{1L}, F_{2L}, \ldots, F_{ML}$ are shifted to lower frequency sides of the central frequencies $F_1, F_2, \ldots, F_M$ of the high-frequency-channel components $CH_1, CH_2, \ldots, CH_M$ respectively. On the other hand, in the remaining N receiving circuits $10_{N+1}$ to $10_{2N}$, as shown in FIG. 4, the frequencies of the local oscillation signals $OS_1, OS_2, \ldots, OS_M$ are set to higher-side oscillation-frequencies $F_{1H}, F_{2H}, \ldots, F_{MH}$. The higher-side oscillation-frequencies $F_{1H}, F_{2H}, \ldots, F_{MH}$ are shifted to higher frequency sides of the central frequencies $F_1, F_2, \ldots, F_M$ of the high-frequency-channel components $CH_1, CH_2, \ldots, CH_M$ respectively.

Here, as for the k-th high-frequency-channel component $CH_k$, the absolute-value $f_1$ ($=|F_k-F_{kL}|$) of a difference between the central frequency $F_k$ and the lower-side oscillation-frequency $F_{kL}$ is always equal to the absolute-value $f_1$ ($=|F_k-F_{kH}|$) of a difference between the central frequency $F_k$ and the higher-side oscillation-frequency $F_{kH}$.

The frequency converter 22 has M mixer circuits $22_1$ to $22_M$, as shown in FIG. 3. The local oscillator 23 generates M oscillation-frequencies specified by the frequency control signal $FC_n$, among (2×M) frequencies at most, that is, generates either the lower-side oscillation-frequencies $F_{1L}$ to $F_{ML}$ or the higher-side oscillation-frequencies $F_{1H}$ to $F_{MH}$.

The mixer circuits $22_1$ to $22_M$ have a function to mix the local oscillation signals $OS_1$ to $OS_M$ with the analog RF signal Srf, thereby generating M low-frequency signals $SL_1, \ldots, SL_M$ having central frequencies $f_1$ to $f_M$ respectively.

Figure 5:
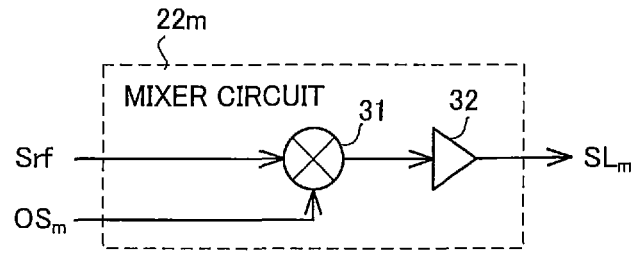
FIG. 5 is a diagram schematically showing a configuration example of a mixer circuit in the first embodiment.

FIG. 5 is a diagram schematically showing a configuration example of the m-th mixer circuit $22_m$. The mixer circuit $22_m$ shown in FIG. 5 includes an analog multiplier 31 and an amplifier 32, and the analog multiplier 31 multiplies (mixes) the analog RF signal Srf by the local oscillation signal $OS_m$ supplied from the local oscillator 23. The analog multiplier 31 outputs a signal having a frequency of a difference ($F_{rf}-f_{OS}$) obtained by subtracting the oscillation-frequency $f_{OS}$ of the local oscillation signal $OS_m$ from the frequency $F_{rf}$ of the analog RF signal Srf and a frequency of the sum ($F_{rf}+f_{OS}$) obtained by adding up the frequencies; since the amplifier 32 attenuates the signal component having the frequency of the sum, it substantially outputs a low-frequency signal $SL_m$ having the subtracted frequency as the central frequency.

For example, if the analog RF signal Srf contains high-frequency-channel components $CH_1$ and $CH_2$ having central frequencies $F_1$=400 MHz and $F_2$=500 MHz respectively, as a result of generating frequency control signals for setting the lower-side oscillation-frequency $F_{1L}$ to 390 MHz, the higher-side oscillation-frequency $F_{1H}$ to 410 MHz, the lower-side oscillation-frequency $F_{2L}$ to 480 MHz, and the higher-side oscillation-frequency $F_{2H}$ to 520 MHz, the absolute value of the central frequency $f_1$ of the low-frequency signal $SL_1$ after frequency conversion becomes 10 MHz, and the absolute value of the central frequency $f_2$ of the low-frequency signal $SL_2$ becomes 20 MHz.

Figure 6:
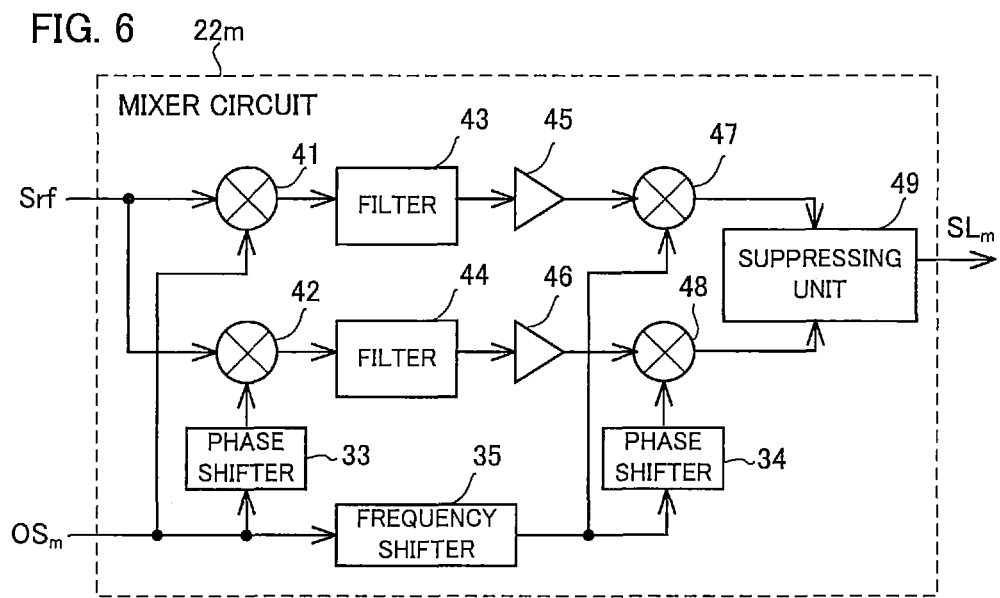
FIG. 6 is a diagram schematically showing another configuration example of the mixer circuit in the first embodiment.

FIG. 6 is a diagram schematically showing another configuration example of the mixer circuit $22_m$. The mixer circuit $22_m$ shown in FIG. 6 is a so-called image suppression mixer. If the analog RF signal Srf contains an image signal component having an image frequency at a point symmetrical to the frequency of a desired signal component with regard to the frequency $f_{OS}$ of the local oscillation signal $OS_m$, the mixer circuit $22_m$ configured as shown in FIG. 5 performs such mixing that the frequency of the image signal component and the frequency of the desired signal component are converted to the same frequency. The image suppression mixer can efficiently suppress such type of image signal component.

The mixer circuit $22_m$ shown in FIG. 6 includes phase shifters 33 and 34, a frequency shift unit 35, preceding-stage multipliers 41 and 42, filters 43 and 44, amplifiers 45 and 46, subsequent-stage multipliers 47 and 48, and a suppressing unit 49. The local oscillation signal $OS_m$ is separated into three branches to be supplied to the preceding-stage multiplier 41, the phase shifter 33, and the frequency shift unit 35. The phase shifter 33 shifts the phase of the input local oscillation signal $OS_m$ by just 90° and supplies the phase-shifted local oscillation signal $OS_m$ to the preceding-stage multiplier 42. On the other hand, the frequency shift unit 35 shifts the oscillation-frequency of the local oscillation signal $OS_m$ and supplies a signal having the shifted frequency to the subsequent-stage multiplier 47 and the phase shifter 34. The phase shifter 34 shifts the phase of the input signal by just 90° and supplies the phase-shifted signal to the subsequent-stage multiplier 48.

The preceding-stage multiplier 41 multiplies (mixes) the analog RF signal Srf by the local oscillation signal $OS_m$. The filter 43 performs filtering of the output of the preceding-stage multiplier 41. The amplifier 45 amplifies the output of the filter 43. On the other hand, the preceding-stage multiplier 42 multiplies (mixes) the analog RF signal Srf by the phase-shifted local oscillation signal $OS_m$. The filter 44 performs filtering of the output of the preceding-stage multiplier 42. The amplifier 46 amplifies the output of the filter 44.

In the subsequent-stage, the subsequent-stage multiplier 47 multiplies (mixes) the output of the amplifier 45 by the output of the frequency shift unit 35. On the other hand, the subsequent-stage multiplier 48 multiplies (mixes) the output of the amplifier 46 by the output of the phase shifter 34. The suppressing unit 49 subtracts one of the outputs from the other one of the outputs of the subsequent-stage multipliers 47 and 48, and outputs the result as the low-frequency signal $SL_m$.

The signal adder 24 adds up the low-frequency signals $SL_1$ to $SL_M$ output from the mixer circuits $22_1$ to $22_M$, thereby generating an analog addition signal ADa. From the analog addition signal ADa, the channel-component extractor 25 can extract K low-frequency-channel components $CT_1, \ldots, CT_K$ corresponding to K high-frequency-channel components among the M high-frequency-channel components $CH_1$ to $CH_M$ (K≤M), as desired signal components.

Figure 7:
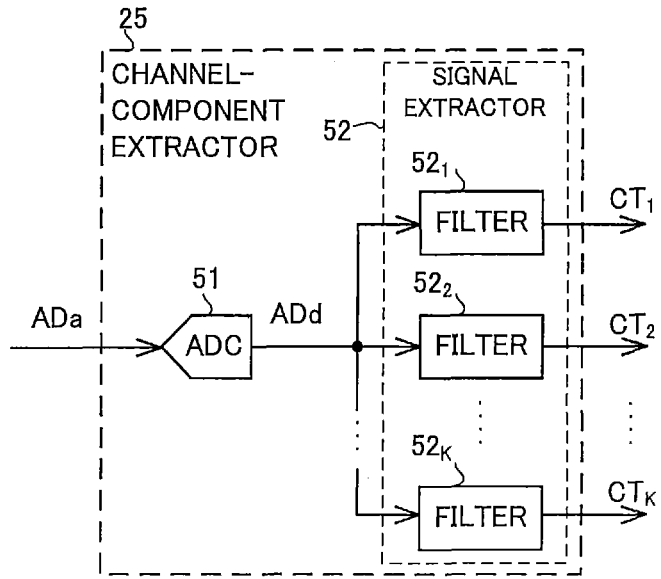
FIG. 7 is a block diagram showing a schematic configuration of a channel-component extractor in the first embodiment.

FIG. 7 is a block diagram showing a schematic configuration of the channel-component extractor 25. The channel-component extractor 25 shown in FIG. 7 includes an A/D converter (ADC) 51 that converts the analog addition signal ADa to a digital addition signal ADd, and a signal extractor 52 that extracts K low-frequency-channel components $CT_1, \ldots, CT_K$ from the digital addition signal ADd. The ADC 51 samples (performs sampling of) the analog addition signal ADa, quantizes the sampled values, and encodes the quantized values to outputs the encoded ones. The signal extractor 52 includes K filters $52_1, \ldots, 52_K$, and these filters $52_1, \ldots, 52_K$ extract low-frequency-channel components $CT_1, \ldots, CT_K$ respectively, from the input digital addition signal ADd. As the filters $52_1, \ldots, 52_K$, FIR (finite impulse response) or IIR (infinite impulse response) digital bandpass filters may be used, for example.

Figure 8A:
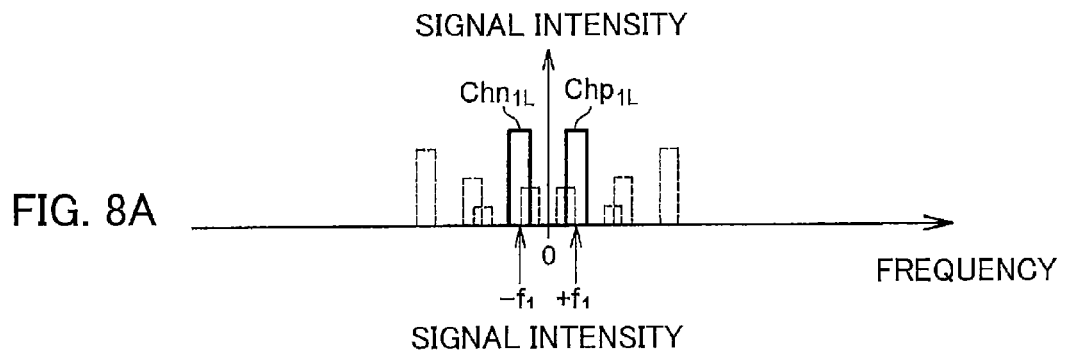
FIGS. 8A to 8C are diagrams schematically showing frequency spectra of low-frequency signals obtained through frequency conversion of high-frequency-channel components by using lower-side oscillation-frequencies.
Figure 8B:
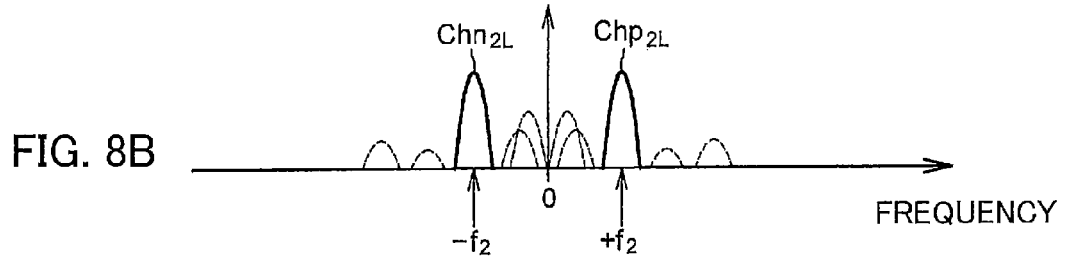
Figure 8C:
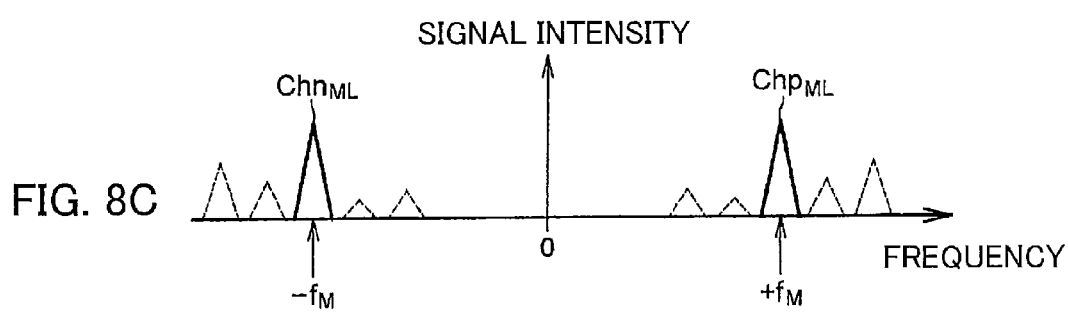

FIGS. 8A to 8C are diagrams schematically showing the frequency spectra of low-frequency signals $SL_1$, $SL_2$ and $SL_M$ obtained when the frequency converter 22 performs frequency conversion of the high-frequency-channel components $CH_1$ to $CH_M$ by using the lower-side oscillation-frequencies $F_{1L}$ to $F_{ML}$. FIG. 8A shows the frequency spectrum of the low-frequency signal $SL_1$. As shown in FIG. 8A, the low-frequency signal $SL_1$ is a combined signal of a positive-frequency component $Chp_{1L}$, the central frequency of which is a positive frequency $+f_1$ and a negative-frequency component $Chn_{1L}$, the central frequency of which is a negative frequency $-f_1$. Similarly, FIG. 8B shows the frequency spectrum of the low-frequency signal $SL_2$ which includes a positive-frequency component $Chp_{2L}$, the central frequency of which is a positive frequency $+f_2$, and a negative-frequency component $Chn_{2L}$, the central frequency of which is a negative frequency $-f_2$. FIG. 8C shows the frequency spectrum of the low-frequency signal $SL_M$ which includes a positive-frequency component $Chp_{ML}$, the central frequency of which is a positive frequency $+f_M$, and a negative-frequency component $Chn_{ML}$, the central frequency of which is a negative frequency $-f_M$.

Figure 9:
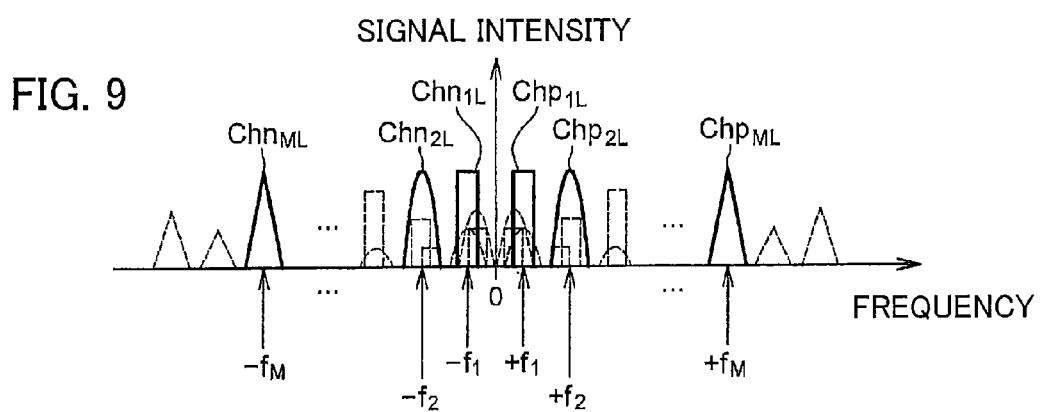
FIG. 9 is a diagram schematically showing a frequency spectrum of a digital addition signal.

FIG. 9 is a diagram schematically showing the frequency spectrum of the digital addition signal ADd obtained when the frequency converter 22 performs frequency conversion of the high-frequency-channel components $CH_1$ to $CH_M$ by using the lower-side oscillation-frequencies $F_{1L}$ to $F_{ML}$. Furthermore, FIGS. 10A to 10C are diagrams schematically showing the frequency spectra of low-frequency-channel components $CT_1$, $CT_2$ and $CT_K$ (K=M) extracted from the digital addition signal ADd in FIG. 9.

Figure 11A:
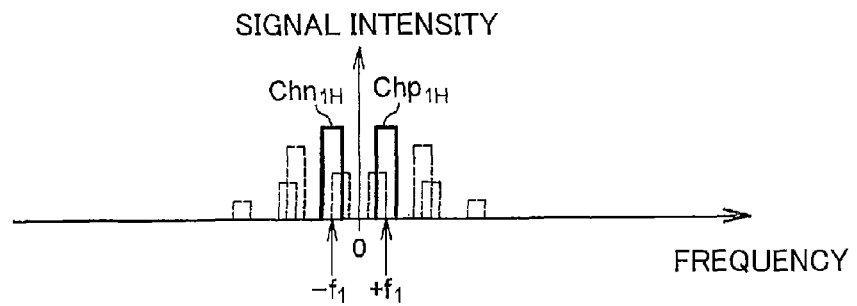
FIGS. 11A to 11C are diagrams schematically showing frequency spectra of low-frequency signals obtained through frequency conversion of high-frequency-channel components by using higher-side oscillation-frequencies.
Figure 11B:
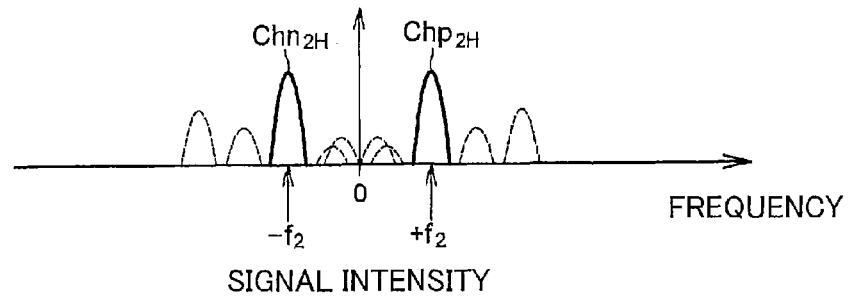
Figure 11C:
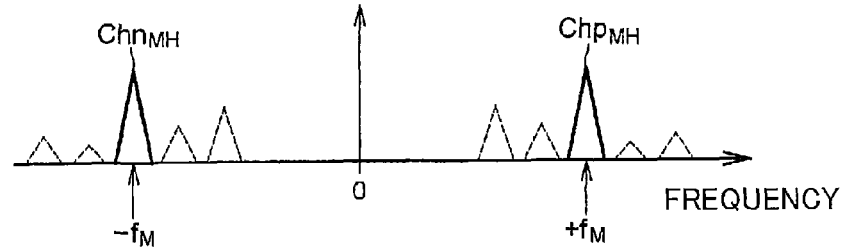

On the other hand, FIGS. 11A to 11C are diagrams schematically showing the frequency spectra of low-frequency signals $SL_1$, $SL_2$ and $SL_M$ obtained when the frequency converter 22 performs frequency conversion of the high-frequency-channel components $CH_1$ to $CH_M$ by using the higher-side oscillation-frequencies $F_{1H}$ to $F_{MH}$. FIG. 11A shows the frequency spectrum of the low-frequency signal $SL_1$. As shown in FIG. 11A, the low-frequency signal $SL_1$ is a combined signal of a positive-frequency component $Chp_{1H}$, the central frequency of which is a positive frequency $+f_1$, and a negative-frequency component $Chn_{1H}$, the central frequency of which is a negative frequency $-f_1$. Similarly, FIG. 11B shows the frequency spectrum of the low-frequency signal $SL_2$ which includes a positive-frequency component $Chp_{2H}$, the central frequency of which is a positive frequency $+f_2$, and a negative-frequency component $Chn_{2H}$, the central frequency of which is a negative frequency $-f_2$. FIG. 11C shows the frequency spectrum of the low-frequency signal $SL_M$ which includes a positive-frequency component $Chp_{MH}$, the central frequency of which is a positive frequency $+f_M$, and a negative-frequency component $Chn_{MH}$, the central frequency of which is a negative frequency $-f_M$.

Figure 12:
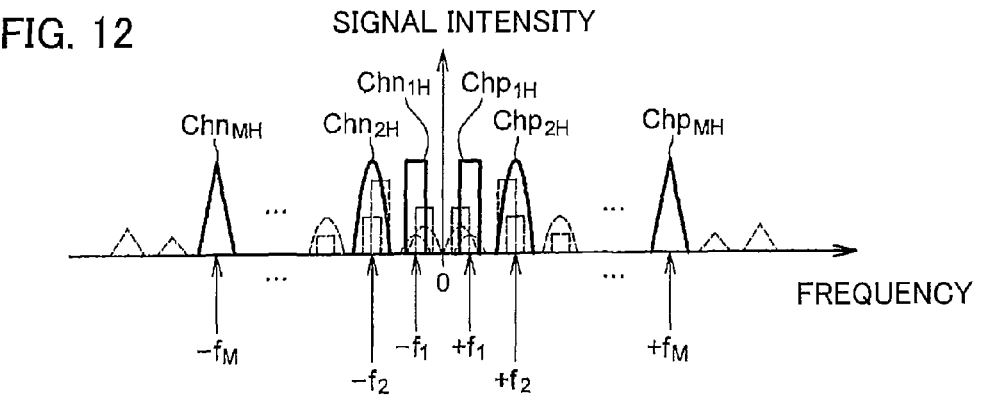
FIG. 12 is a diagram schematically showing a frequency spectrum of the digital addition signal.
Figure 13A:
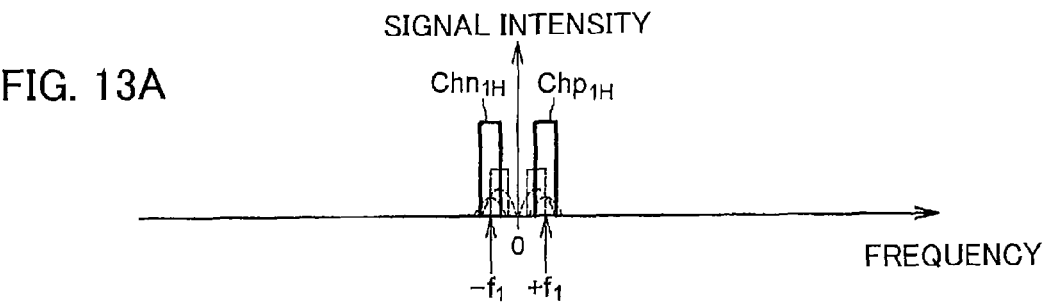
FIGS. 13A to 13C are diagrams schematically showing frequency spectra of low-frequency-channel components extracted from the digital addition signal in FIG. 12.
Figure 13B:
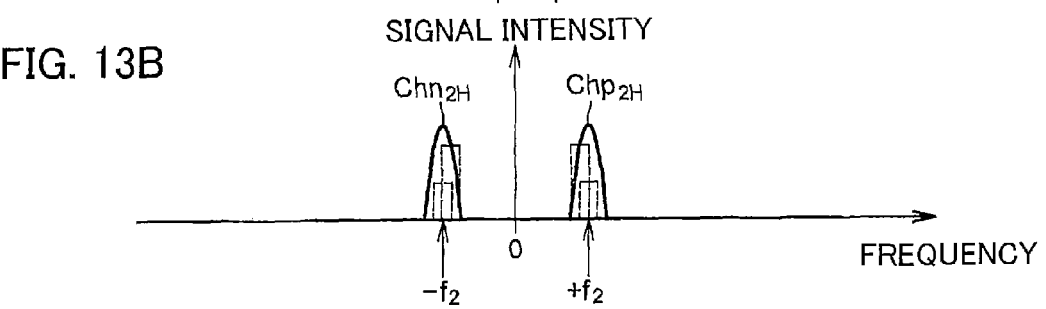
Figure 13C:
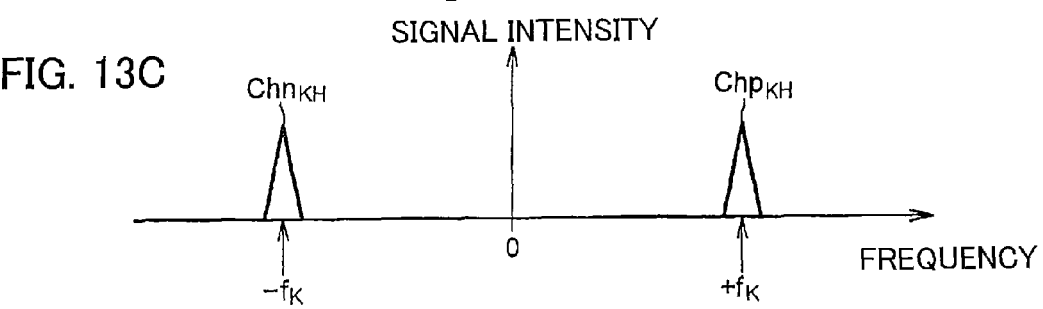

FIG. 12 is a diagram schematically showing the frequency spectrum of the digital addition signal ADd obtained when the frequency converter 22 performs frequency conversion of the high-frequency-channel components $CH_1$ to $CH_M$ by using the higher-side oscillation-frequencies $F_{1H}$ to $F_{MH}$. Furthermore, FIGS. 13A to 13C are diagrams schematically showing the frequency spectra of low-frequency-channel components $CT_1$, $CT_2$ and $CT_K$ (K=M) extracted from the digital addition signal ADd in FIG. 12.

Figure 10A:
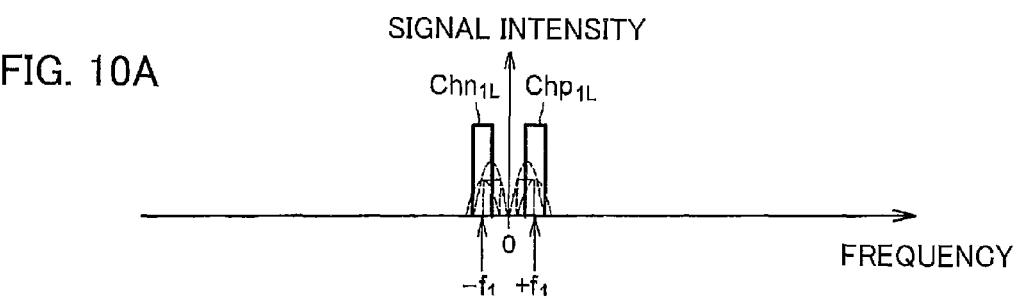
FIGS. 10A to 10C are diagrams schematically showing frequency spectra of low-frequency-channel components extracted from the digital addition signal in FIG. 9.
Figure 10B:
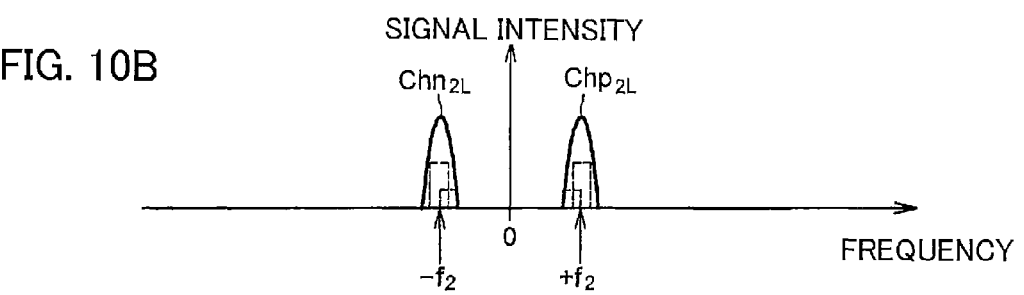
Figure 10C:
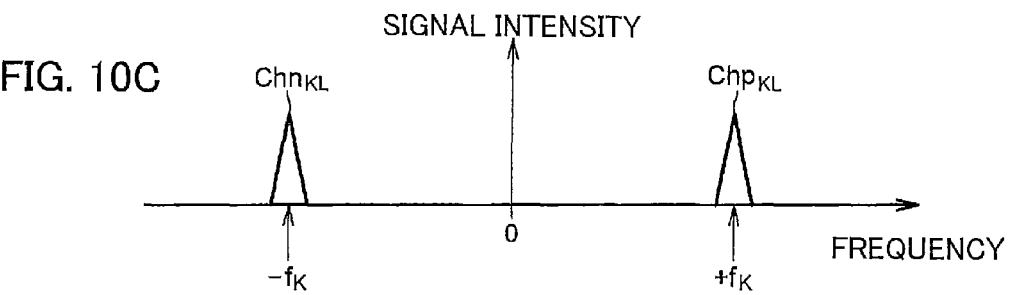

Unwanted signal components (interference signal components) indicated by dashed lines are superposed on the positive-frequency components $Chp_{1H}$, $Chp_{2H}$ and negative-frequency components $Chn_{1L}$, $Chn_{2L}$ shown in FIGS. 10A and 10B. On the other hand, unwanted signal components (interference signal components) indicated by dashed lines are superposed on the positive-frequency components $Chp_{1H}$, $Chp_{2H}$ and negative-frequency components $Chn_{1H}$, $Chn_{2K}$ shown in FIGS. 13A and 13B. It can be understood that the unwanted signal components shown in FIGS. 13A and 13B differ from the unwanted signal components shown in FIGS. 10A and 10B, and a mutual correlation between them is low.

The configuration of the channel signal processor 26 will next be described.

As shown in FIG. 3, the channel signal processor 26 includes K signal processors $26_1, \ldots, 26_K$. The signal processors $26_1, \ldots, 26_K$ perform signal processing (detection processing) on the low-frequency-channel components $CT_1, \ldots, CT_K$ and output low-frequency-channel processing signals (detected signals) P(n, 1), ..., P(n, K).

Figure 14:
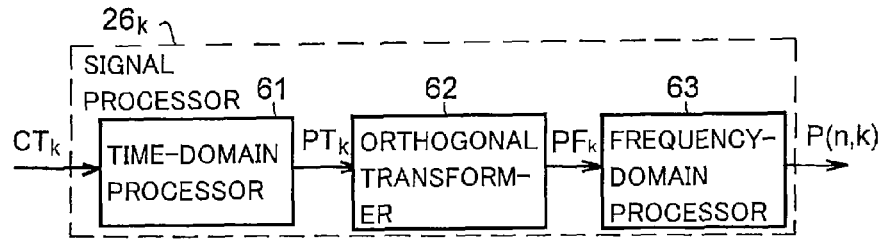
FIG. 14 is a block diagram schematically showing a configuration example of a signal processor.

FIG. 14 is a block diagram schematically showing a configuration example of the k-th signal processor $26_k$. The signal processor $26_k$ in FIG. 14 includes a time-domain processor 61 that performs signal processing of the low-frequency-channel component $CT_K$ in the time domain, an orthogonal transformer (domain transformer) 62 that performs orthogonal transformation, such as Fourier transformation, of an output $PT_k$ of the time-domain processor 61, thereby generating a frequency-domain signal $PF_k$, and a frequency-domain processor 63 that performs signal processing of the frequency-domain signal $PF_k$.

Figure 15:
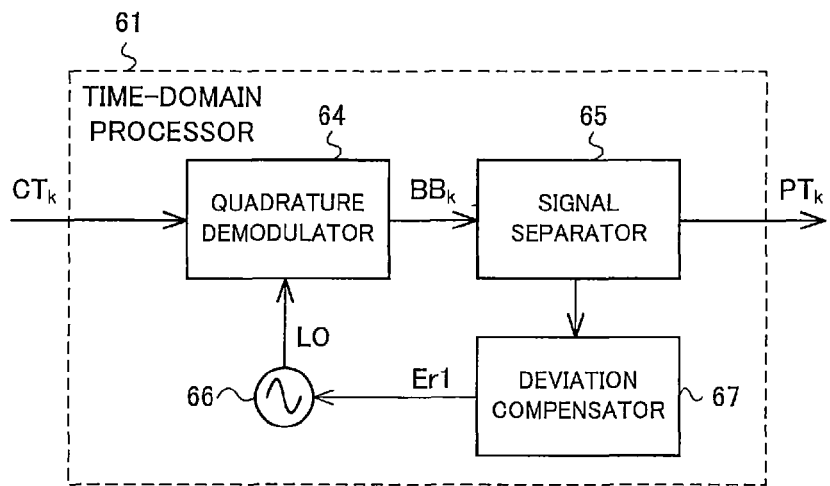
FIG. 15 is a block diagram schematically showing a configuration example of a time-domain processor.

FIG. 15 is a block diagram schematically showing a configuration example of the time-domain processor 61. The time-domain processor 61 includes a local oscillator 66, a quadrature demodulator 64, a signal separator 65, and a deviation compensator 67. The local oscillator 66 may be configured by using a numerically controlled oscillator (NCO), for example.

The local oscillator 66 supplies a local oscillation signal LO to the quadrature demodulator 64. The quadrature demodulator 64 performs quadrature demodulation of the low-frequency-channel component $CT_k$ by using the local oscillation signal LO, thereby generating a complex baseband signal $BB_k$ containing an in-phase component Ich and a quadrature component Qch. When the frequency converter 22 of the receiving circuit $10_n$ executes frequency conversion by using lower-side oscillation-frequencies $F_{1L}$ to $F_{ML}$, the quadrature demodulator 64 executes quadrature demodulation by using a positive oscillation-frequency. On the other hand, when the frequency converter 22 of the receiving circuit $10_n$ executes frequency conversion by using higher-side oscillation-frequencies $F_{1H}$ to $F_{MH}$, the quadrature demodulator 64 executes quadrature demodulation by using a negative oscillation-frequency.

Figure 16:
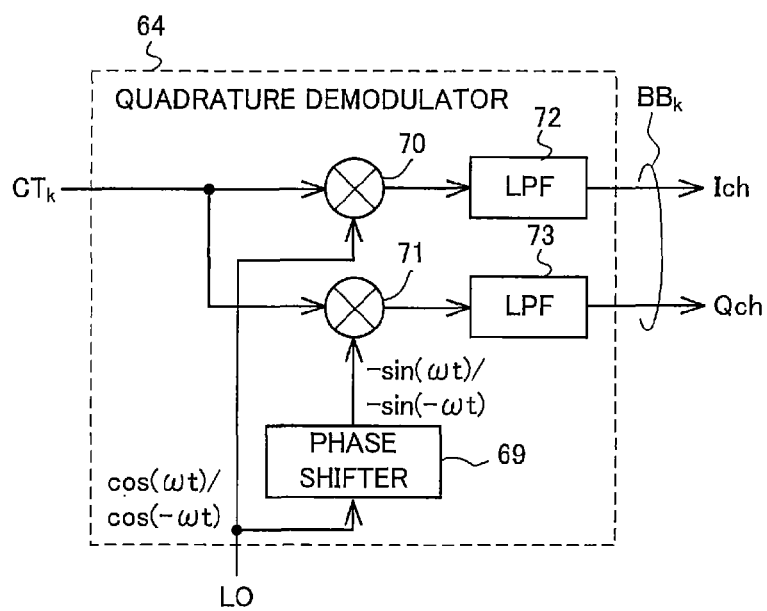
FIG. 16 is a block diagram schematically showing a configuration example of a quadrature demodulator.

FIG. 16 is a block diagram schematically showing a configuration example of the quadrature demodulator 64. As shown in FIG. 16, the quadrature demodulator 64 includes a phase shifter 69, multipliers 70 and 71, and low-pass filters (LPFs) 72 and 73. The local oscillator 66 supplies the multiplier 70 and the phase shifter 69 with a local oscillation signal LO having frequency $\omega/2\pi$ corresponding to the central frequencies $\pm f_k$ of the low-frequency-channel component $CT_k$. The phase shifter 69 shifts the local oscillation signal LO by just 90° ($=\pi/2$ radians) and supplies the shifted signal to the multiplier 71. The multiplier 70 multiplies (mixes) the low-frequency-channel component $CT_k$ by the local oscillation signal LO, and the other multiplier 71 multiplies (mixes) the low-frequency-channel component $CT_k$ by the shifted local oscillation signal LO. The LPF 72 attenuates a harmonic component of an output of the multiplier 70 and outputs the in-phase component Ich, and the LPF 73 attenuates a harmonic component of an output of the multiplier 71 and outputs the quadrature component Qch. Then, the complex baseband signal $BB_k$ containing the in-phase component Ich and the quadrature component Qch is output.

In a case where the frequency converter 22 here executes frequency conversion by using the lower-side oscillation-frequencies $F_{1L}$ to $F_{ML}$, the local oscillator 66 can supply the quadrature demodulator 64 with a cosine wave having a positive frequency as the local oscillation signal LO. On the other hand, in a case where the frequency converter 22 executes frequency conversion by using the higher-side oscillation-frequencies $F_{1H}$ to $F_{MH}$, the local oscillator 66 can supply the quadrature demodulator 64 with a cosine wave having a negative frequency as the local oscillation signal LO.

The signal separator 65 extracts a time-domain information signal $PT_k$ from the complex baseband signal $BB_k$ and supplies the extracted information signal $PT_k$ to the orthogonal transformer 62. On the other hand, the signal separator 65 extracts a non-information signal (a signal which is not used as an information signal) from a sequence of the complex baseband signal $BB_k$ and supplies the extracted non-information signal to the deviation compensator 67. If a sequence of the complex baseband signal $BB_k$ contains a header section or a guard interval section (cyclic prefix), the signal of the header section or the guard interval section may be extracted and supplied to the deviation compensator 67. The deviation compensator 67 generates, on the basis of the supplied non-information signal, a compensation signal Er1 for compensating for a deviation such as a carrier frequency error and/or a clock frequency error, and outputs the compensation signal Er1 to the local oscillator 66. The local oscillator 66 controls the oscillation-frequency of the local oscillation signal LO so as to reduce the deviation in accordance with the compensation signal Er1.

Figure 17:
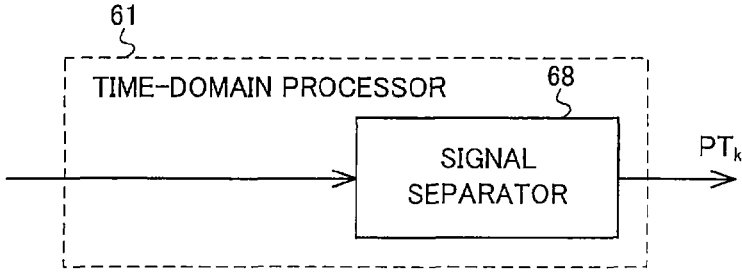
FIG. 17 is a diagram showing another configuration example of the time-domain processor.

A quadrature demodulator having the same configuration as the quadrature demodulator 64 can be incorporated into the channel-component extractor 25. In this case, the time-domain processor 61 does not need to include the quadrature demodulator 64. FIG. 17 is a diagram showing a schematic configuration of the time-domain processor 61 in that case. As shown in FIG. 17, the time-domain processor 61 includes just a signal separator 68. The signal separator 68 extracts an information signal $PT_k$ from the sequence of the complex baseband signal input from the previous stage and supplies the extracted information signal $PT_k$ to the orthogonal transformer 62.

Figure 18:
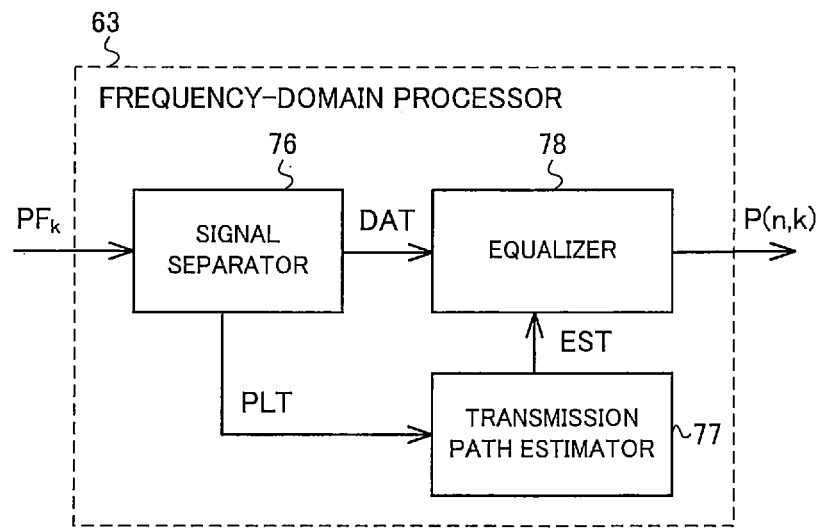
FIG. 18 is a block diagram schematically showing a configuration example of a frequency-domain processor in FIG. 14.

FIG. 18 is a block diagram schematically showing a configuration example of the frequency-domain processor 63 in FIG. 14. As shown in FIG. 18, the frequency-domain processor 63 includes a signal separator 76, an equalizer 78, and a transmission path estimator 77. The signal separator 76 extracts a received known signal PLT such as a pilot signal and a data signal DAT from a sequence of a frequency-domain signal $PF_k$ and supplies the received known signal PLT to the transmission path estimator 77 and the data signal DAT to the equalizer 78. The transmission path estimator 77 estimates a transmission path response with reference to the received known signal PLT and supplies the equalizer 78 with an estimation signal EST expressing the estimated value. The equalizer 78 can correct distortion of the data signal DAT by using the estimation signal EST according to the known zero-forcing criterion and can output the corrected data signal as a low-frequency-channel processing signal (detected signal) P(n, k), for example. The transmission path response estimation method is not limited, and the estimation method described in non-patent reference 2 (Kazuhisa Haeiwa, "Modulation/Demodulation Techniques for Digital Communication and Broadcasting," Corona Publishing Co., Ltd, Jan. 5, 2009, pp. 132-134) can be used, for example.

Figure 19:
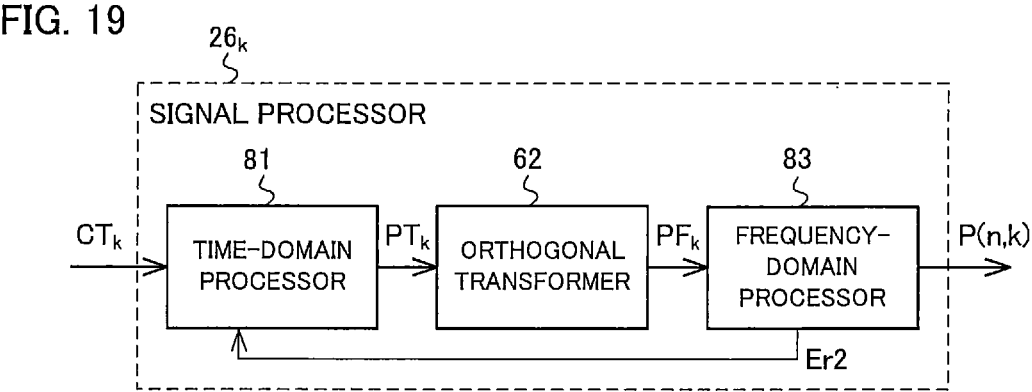
FIG. 19 is a block diagram schematically showing another configuration example of the signal processor.

FIG. 19 is a block diagram schematically showing another configuration example of the signal processor $26_k$. The signal processor $26_k$ in FIG. 19 includes a time-domain processor 81 that performs signal processing on a time-domain low-frequency-channel component $CT_k$, an orthogonal transformer (domain transformer) 62 that performs orthogonal transformation, such as Fourier transformation, of an output $PT_k$ of the time-domain processor 81, thereby generating a frequency-domain signal $PF_k$, and a frequency-domain processor 83 that performs signal processing of the frequency-domain signal $PF_k$.

Figure 20:
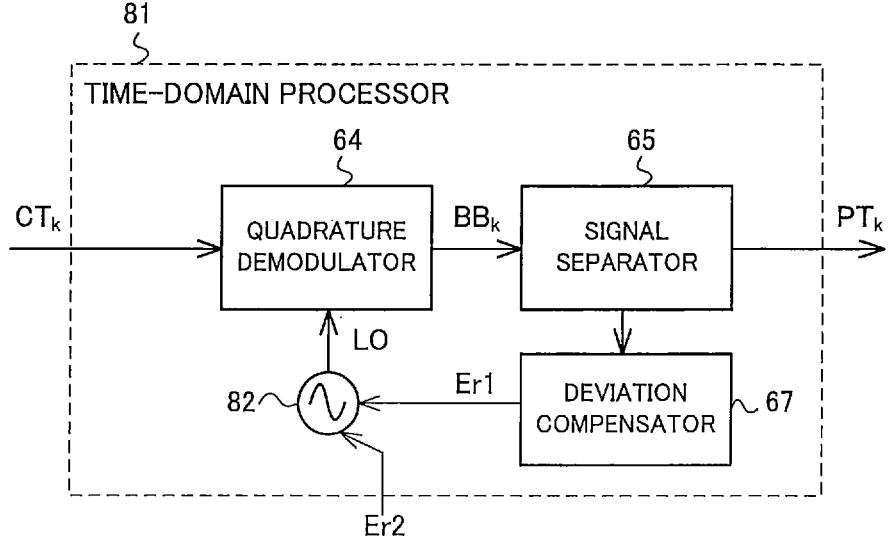
FIG. 20 is a block diagram showing a schematic configuration of the time-domain processor in FIG. 19.
Figure 21:
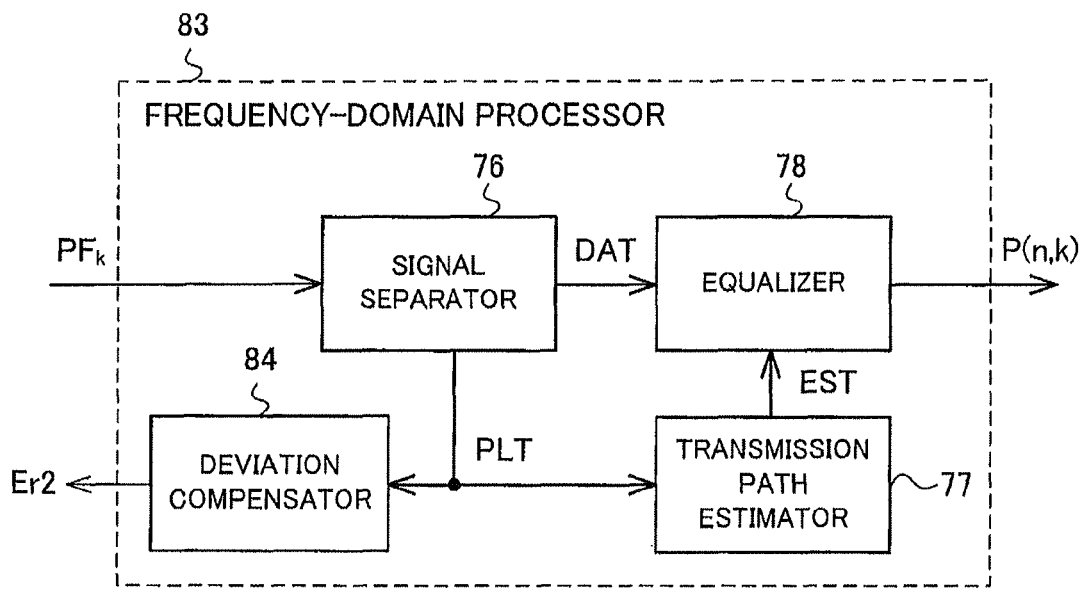
FIG. 21 is a block diagram showing a schematic configuration of the frequency-domain processor in FIG. 19.

FIG. 20 is a block diagram showing a schematic configuration of the time-domain processor 81 in FIG. 19. The time-domain processor 81 has the same configuration as the time-domain processor 61 in FIG. 15 except that a local oscillator 82 is provided instead of the local oscillator 66. Further, FIG. 21 is a block diagram showing a schematic configuration of the frequency-domain processor 83 in FIG. 19. The frequency-domain processor 83 has the same configuration as the frequency-domain processor 63 in FIG. 18 except that a deviation compensator 84 is provided.

The deviation compensator 84 shown in FIG. 21 generates a frequency-axis compensation signal Er2 for compensating for a deviation such as a carrier frequency error and/or a clock frequency error in accordance with the received known signal PLT and outputs the frequency-axis compensation signal Er2 to the local oscillator 82 in FIG. 20. The local oscillator 82 can control the oscillation-frequency of the local oscillation signal LO so as to reduce the deviation in accordance with the frequency-axis compensation signal Er2.

The diversity combining unit 12 shown in FIG. 2 will next be described.

As shown in FIG. 2, the diversity combining unit 12 includes K signal combining units $12_1$ to $12_K$. To the k-th signal combining unit $12_k$, detected signals P(1, k) to P(N, k) and P(N+1, k) to P(2N, k) having the same frequency are input. The signal combining unit $12_k$ combines the detected signals P(1, k) to P(N, k) and P(N+1, k) to P(2N, k), thereby outputting a combined signal $C_k$. As the combining method, the equal-gain combining method to output the total sum of all the input detected signals P(1, k) to P(N, k) and P(N+1, k) to P(2N, k), may be used, or the maximal-ratio combining method to adjust amplitudes of the input detected signals P(1, k) to P(N, k) and P(N+1, k) to P(2N, k) individually and then outputs the total sum of the detected signals, may be used.

Figure 22:
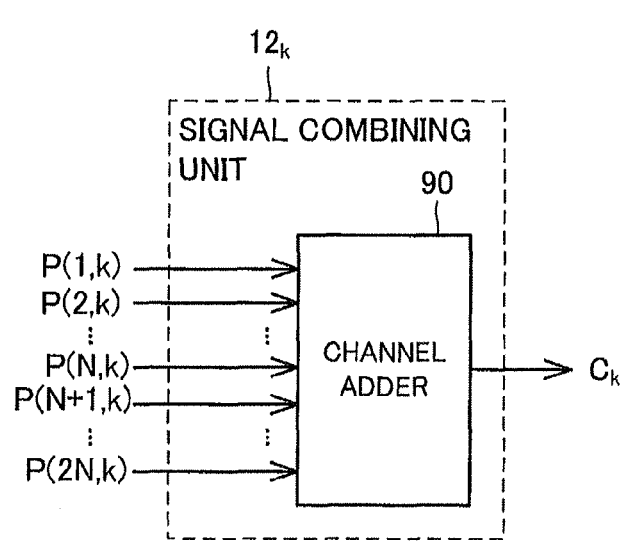
FIG. 22 is a block diagram showing a configuration example of a signal combining unit implementing the equal-gain combining method.

FIG. 22 is a block diagram showing a configuration example of the signal combining unit $12_k$ that implements the equal-gain combining method. The signal combining unit $12_k$ in FIG. 22 includes a channel adder 90 that outputs the total sum of all the input detected signals P(1, k) to P(N, k) and P(N+1, k) to P(2N, k). The channel adder 90 may output a signal indicating an expectation value of the input detected signals P(1, k) to P(N, k) and P(N+1, k) to P(2N, k) as the combined signal $C_k$, instead of the total sum of the input detected signals P(1, k) to P(N, k) and P(N+1, k) to P(2N, k).

Figure 23:
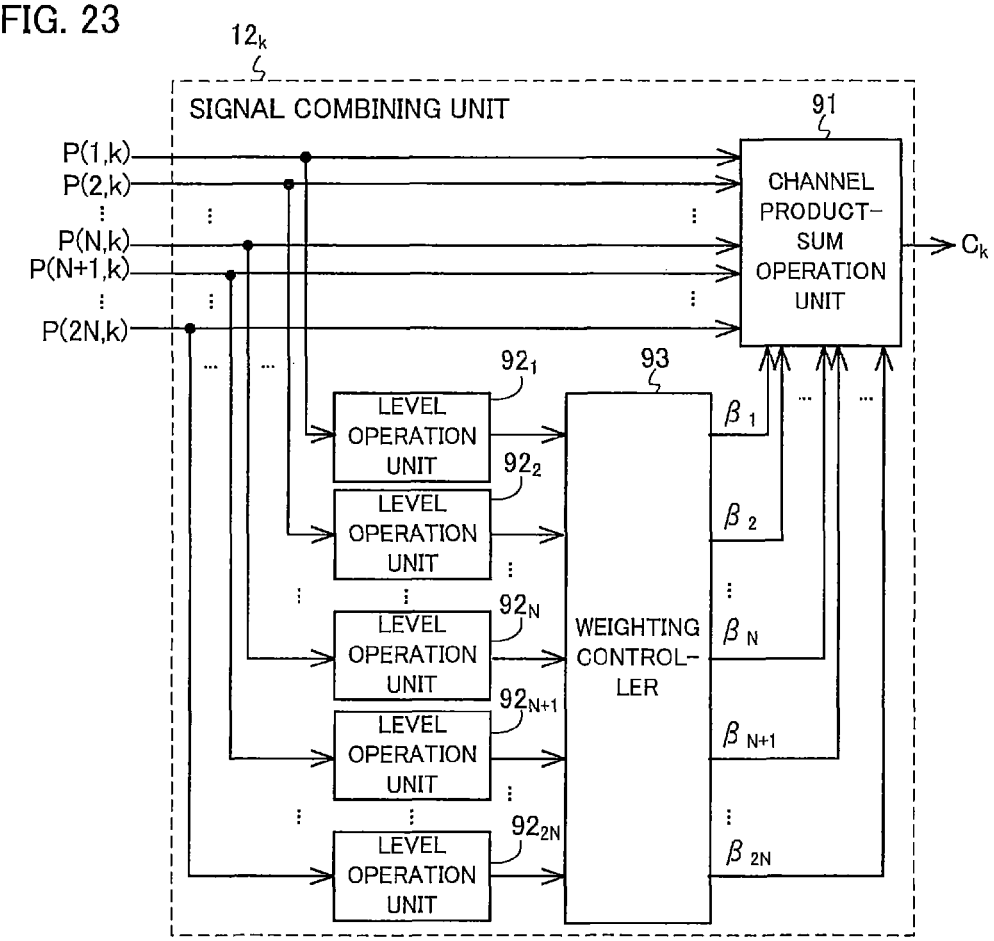
FIG. 23 is a block diagram showing another configuration example of the signal combining unit implementing the maximal-ratio combining method.
Figure 24:
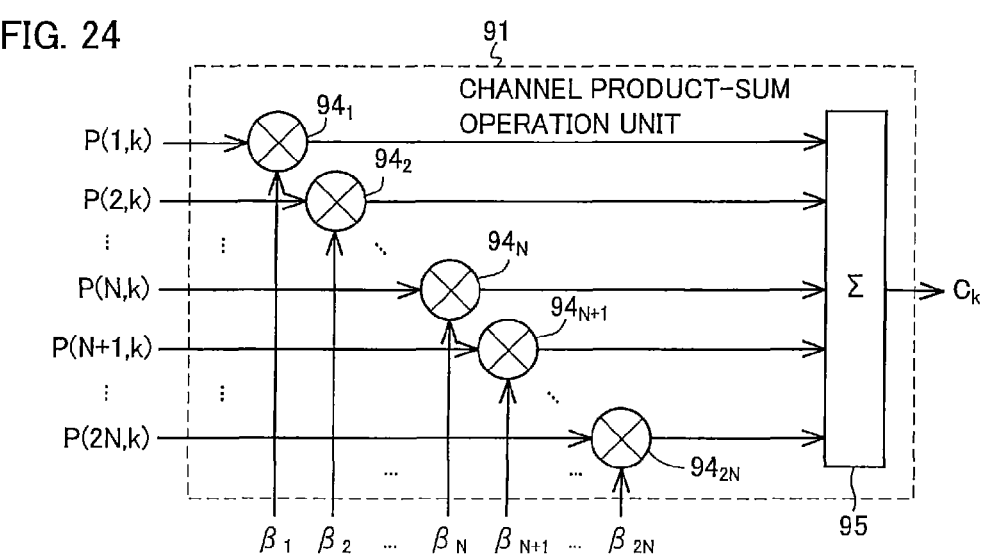
FIG. 24 is a block diagram showing a configuration of a channel product-sum operation unit in FIG. 23.

FIG. 23 is a block diagram showing another configuration example of the signal combining unit $12_k$ implementing the maximal-ratio combining method. The signal combining unit $12_k$ in FIG. 23 includes a channel product-sum operation unit 91 that executes a product-sum operation, level operation units $92_1$ to $92_{2N}$, and a weighting controller 93. FIG. 24 is a block diagram showing a configuration of the channel product-sum operation unit 91 in FIG. 23.

The level operation units $92_1$ to $92_{2N}$ supply the weighting controller 93 with level signals that indicate amplitudes of or time mean values of the amplitudes of the input detected signals P(1, k) to P(2N, k), or power of or time mean values of the power of the input detected signals P(1, k) to P(2N, k). The weighting controller 93 sets weighting coefficients $\beta_1$ to $\beta_{2N}$ in accordance with the level signals and supplies the weighting coefficients $\beta_1$ to $\beta_{2N}$ to the channel product-sum operation unit 91. The weighting controller 93 can calculate the ratio of values of the (2×N) level signals supplied from the level operation units $92_1$ to $92_{2N}$ and can supply the calculated results as weighting coefficients $\beta_1$ to $\beta_{2N}$ to the channel product-sum operation unit 91.

As shown in FIG. 24, the channel product-sum operation unit 91 includes multipliers $94_1$ to $94_{2N}$ and an adder 95. The multiplier $94_1$ to $94_{2N}$ weight (multiply) the detected signals P(1, k) to P(2N, k) by the weighting coefficients $\beta_1$ to $\beta_{2N}$ respectively. The adder 95 outputs the total sum of all the outputs of the multiplier $94_1$, to $94_{2N}$ as a combined signal $C_k$.

The decision unit 13 shown in FIG. 2 includes K signal decision units $13_1$ to $13_K$. The signal decision units $13_1$ to $13_K$ can decide signal points of combined signals $C_1$ to $C_K$ input from the signal combining units $12_1$ to $12_K$ respectively, through a demapping process (soft decision process) and a hard decision process. The signal decision units $13_1$ to $13_K$ output demodulated signals $D_1$ to $D_K$ which indicate the signal points obtained as a result, in parallel. The diversity receiving device 1 in this embodiment can therefore receive K channels concurrently.

In the N receiving circuits $10_1$ to $10_N$, as described earlier, as shown in FIG. 4, the frequencies of local oscillation signals $OS_1, OS_2, \ldots, OS_M$ are set to the lower-side oscillation-frequencies $F_{1L}, F_{2L}, \ldots, F_{ML}$ respectively which are shifted to the lower frequency sides of the central frequencies $F_1, F_2, \ldots, F_M$ of the high-frequency-channel components $CH_1, CH_2, \ldots, CH_M$. Each of the receiving circuits $10_1$ to $10_N$ then executes frequency conversion by using the lower-side oscillation-frequencies $F_{1L}, F_{2L}, \ldots, F_{ML}$, thereby generating low-frequency signals $SL_1, SL_2, \ldots, SL_M$ having the frequency spectra as shown in FIGS. 8A to 8C, and adds the low-frequency signals $SL_1, SL_2, \ldots, SL_M$, thereby generating an analog addition signal Ada as shown in FIG. 9.

On the other hand, in the remaining N receiving circuits $10_{N+1}$ to $10_{2N}$, as shown in FIG. 4, the frequencies of the local oscillation signals $OS_1, OS_2, \ldots, OS_M$ are set to the higher-side oscillation-frequencies $F_{1H}, F_{2H}, \ldots, F_{MH}$ respectively which are shifted to the higher frequency sides of the central frequencies $F_1, F_2, \ldots, F_M$ of the high-frequency-channel components $CH_1, CH_2, \ldots, CH_M$. Each of the receiving circuits $10_{N+1}$ to $10_{2N}$ then executes frequency conversion by using the higher-side oscillation-frequencies $F_{1H}, F_{2H}, \ldots, F_{MH}$, thereby generating low-frequency signals $SL_1, SL_2, \ldots, SL_M$ having the frequency spectra as shown in FIGS. 11A to 11C, and adds the low-frequency signals $SL_1, SL_2, \ldots, SL_M$, thereby generating an analog addition signal Ada as shown in FIG. 12.

The frequency spectrum of the analog addition signal ADa shown in FIG. 9 and the frequency spectrum of the analog addition signal ADa shown in FIG. 12 are obtained from an analog RF signal having a frequency spectrum which is substantially the same as that shown in FIG. 4. It is known that the central frequencies $\pm f_1, \pm f_2, \ldots, \pm f_M$ of desired signal components are mutually the same in the two frequency spectra, but the frequency positions of unwanted signal components (interference signal components) indicated by dashed lines in the two frequency spectra differ from each other. For example, the interference signal components superposed on the desired signal components $Chn_{1L}$ and $Chp_{1L}$ in FIG. 9 are obtained from the unwanted signal components Na1, Na2 and Nb2 in FIG. 4, but the interference signal components superposed on the desired signal components $Chn_{1H}$ and $Chp_{1H}$ in FIG. 12 are obtained from the unwanted signal components Pa1, Pa2 and Pb2 in FIG. 4.

The diversity receiving device 1 in this embodiment can therefore move frequency positions (positions in the frequency domain) of mutually highly correlated unwanted signal components (interference signal components) that have been put into different receiving systems to different positions. This causes the unwanted signal components superposed on the desired signal components $Chp_{1L}, Chp_{2L}, Chn_{1L}$ and $Chn_{2L}$ shown in FIGS. 10A and 10B and the unwanted signal components (interference signal components) superposed on the desired signal components $Chp_{1H}, Chp_{2H}, Chn_{1H}$ and $Chn_{2H}$ shown in FIGS. 13A and 13B, for example, to be signal components having a low degree of correlation between them. Thus, by combining the detected signals P(1, k) to P(N, k) and P(N+1, k) to P(2N, k) having the same frequency, the unwanted signal components contained in the detected signals P(1, k) to P(N, k) and P(N+1, k) to P(2N, k) can be cancelled out. Therefore, the unwanted signal components can be suppressed effectively, independently of the signal format specified by the broadcast standard. Further, diversity combining allows unwanted signals to be reduced efficiently while the quality of desired signals is maintained.

Second Embodiment

Figure 25:
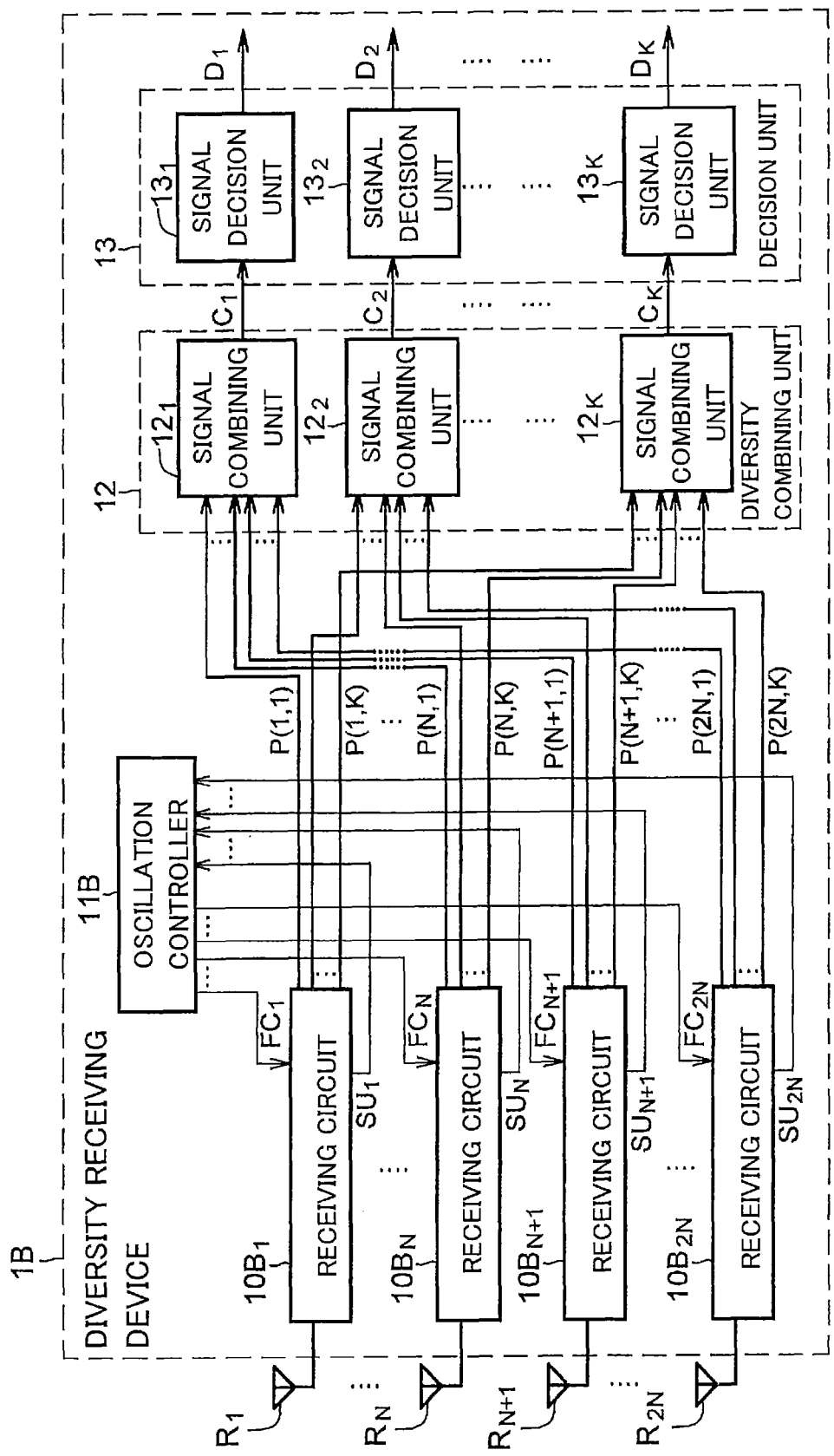
FIG. 25 is a block diagram showing a schematic configuration of a diversity receiving device according to a second embodiment of the present invention.

A second embodiment of the present invention will next be described. FIG. 25 is a block diagram showing a schematic configuration of a diversity receiving device 1B in the second embodiment.

As shown in FIG. 25, the diversity receiving device 1B includes: receiving antenna elements $R_1, \ldots, R_{2N}$ which form (2×N) independent receiving systems (N is an integer not less than 2); receiving circuits $10_{B1}, \ldots, 10_{B2N}$ that receive transmission signals through the receiving antenna elements $R_1, \ldots, R_{2N}$ respectively; an oscillation controller 11B that controls individually oscillation-frequencies of oscillation signals used in the receiving circuits $10B_1$ to $10B_{2N}$; a diversity combining unit 12 that combines outputs P(1, 1) to P(2N, K) (K is an integer not less than 2) of the receiving circuits $10B_1$ to $10B_{2N}$ for each same frequency component; and a decision unit 13 that decides signal points of combined outputs $C_1, \ldots, C_K$ of the diversity combining unit 12.

Like the oscillation controller 11, the oscillation controller 11B supplies frequency control signals $FC_1, \ldots, FC_{2N}$. The oscillation controller 11B in this embodiment also has a function to perform frequency control on the basis of adjacent level signals $SU_1$ to $SU_{2N}$ output from the receiving circuits $10B_1$ to $10B_{2N}$ respectively.

Figure 26:
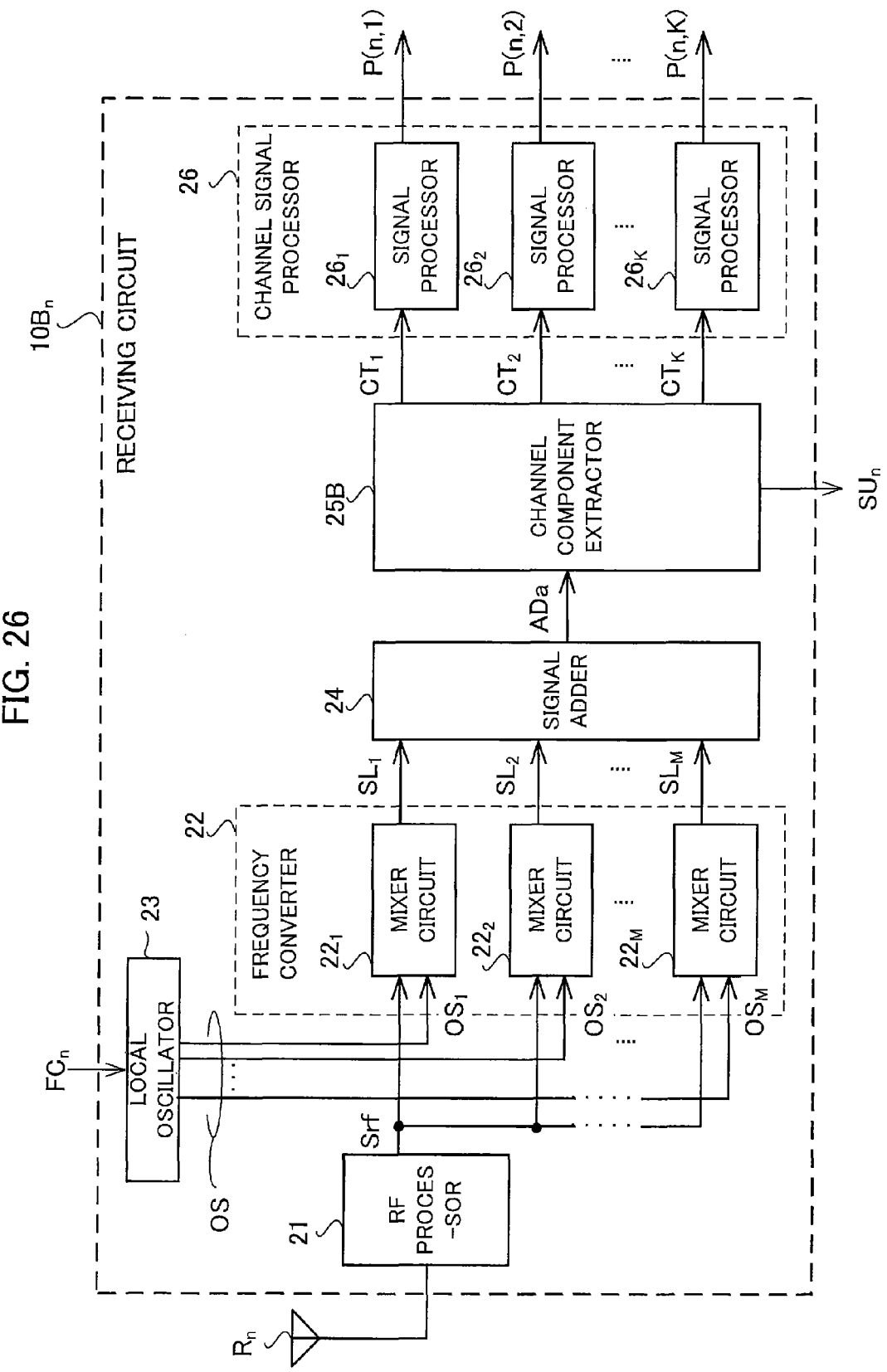
FIG. 26 is a block diagram showing a schematic configuration of a receiving circuit in the second embodiment.

FIG. 26 is a block diagram showing a schematic configuration of the n-th receiving circuit $10B_n$. The configuration of the receiving circuit $10B_n$ is the same as the configuration of the receiving circuit $10_n$ in FIG. 3 except that a channel-component extractor 25B is provided instead of the channel-component extractor 25.

Figure 27:
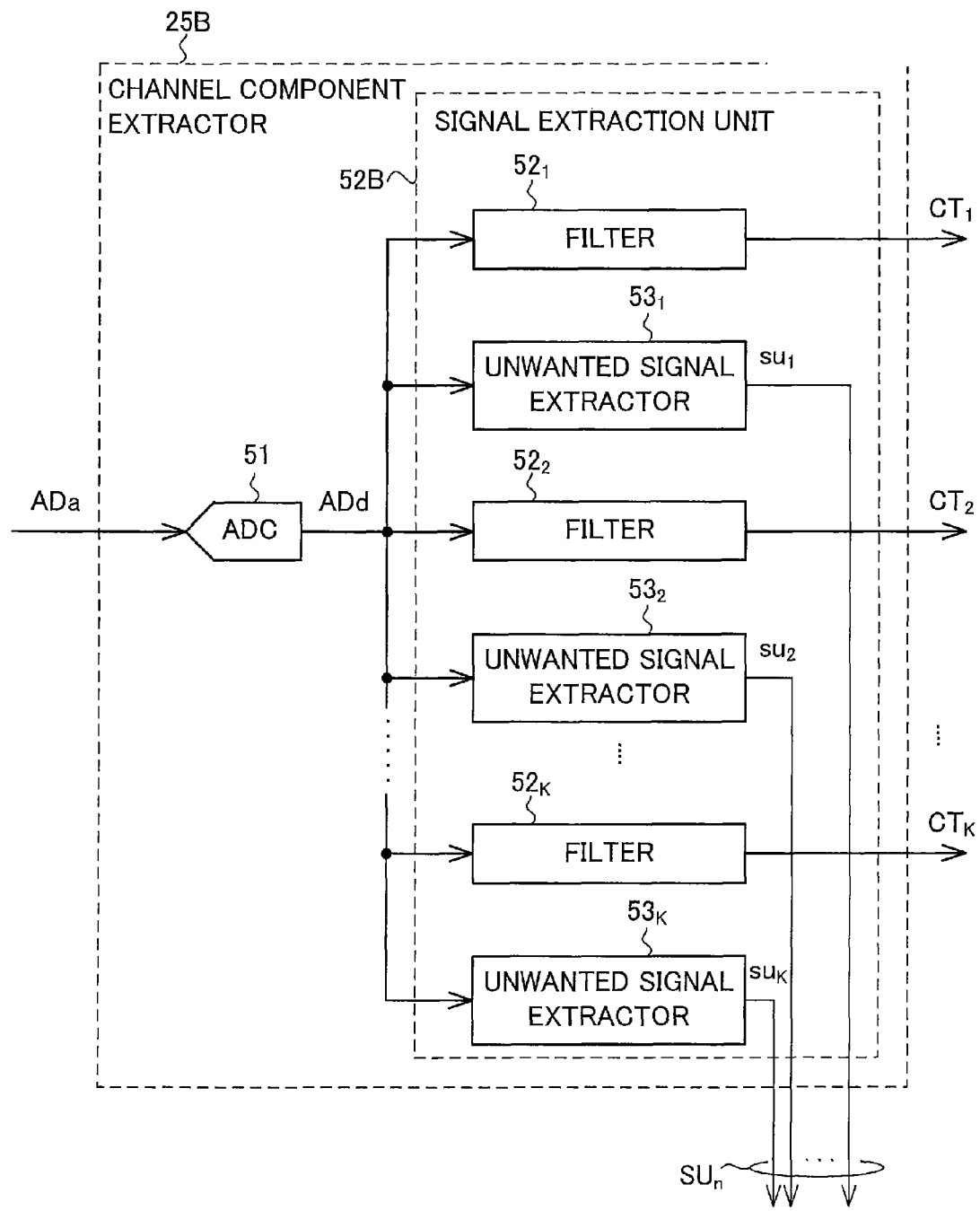
FIG. 27 is a block diagram showing a schematic configuration of a channel-component extractor in the second embodiment.

FIG. 27 is a block diagram showing a schematic configuration of the channel-component extractor 25B. Like the signal extractor 52 in the first embodiment, a signal extractor 52B in the channel-component extractor 25B includes filters $52_1$ to $52_K$ that extract K low-frequency-channel components $CT_1, \ldots, CT_K$ as desired signal components, from an analog addition signal ADa, as shown in FIG. 27. The channel-component extractor 25B in this embodiment further includes unwanted-signal extractors $53_1$ to $53_K$ that extract signals in frequency bands adjacent to the frequency bands of the low-frequency-channel components $CT_1$ to $CT_K$ as unwanted signal components, from a digital addition signal ADd. The unwanted-signal extractors $53_1$ to $53_K$ can output a signal indicating signal level information of the extracted unwanted signal components $su_1$ to $su_k$ as an adjacent level signal $SU_n$. The signal level information here includes the amplitude of the signal or its time mean value or the power and its time mean value, for example.

In the second embodiment, as described above, the oscillation controller 11B can control the operation beforehand to minimize the unwanted signals superposed on all the desired signals on the basis of the adjacent level signals $SU_1$ to $SU_{2N}$, and the unwanted signals can be reduced efficiently while the quality of the desired signals is maintained.

The embodiments of the present invention described above with reference to the drawings are examples of the present invention, and other various embodiments can be also adopted. For example, the diversity receiving devices 1 and 1B in the first and second embodiments include four or more receiving circuits $10_1$ to $10_{2N}$ corresponding to four or more receiving systems, but they are not limited to this configuration. The first and second embodiments may be modified so that two receiving circuits $10_1$ and $10_2$ corresponding to two receiving systems are provided.

Further, a part of the functions (a function to execute digital signal processing, in particular) in the first and second embodiments may be implemented by hardware or may be implemented by computer programs that are executed by a microprocessor including a CPU. If the part of the functions is implemented by computer programs, the microprocessor may implement the part of the functions by loading the computer program from a computer-readable recording medium (such as an optical disc, magnetic recording medium, and flash memory) and executing it.

Furthermore, a part of the configurations of the first and second embodiments may also be implemented by LSIs (large-scale integrated circuits) such as an FPGA (field-programmable gate array) and an ASIC (application specific integrated circuit).

The diversity receiving devices 1 and 1B in the first and second embodiments can also be incorporated into communication apparatuses such as a digital terrestrial broadcast receiving apparatus, wireless LAN equipment, or a receiving terminal for a mobile communication system.

REFERENCE CHARACTERS 1, 1B diversity receiving device; $R_1$ to $R_{2N}$ receiving antenna element; $10_1$ to $10_{2N}$, $10B_1$ to $10B_{2N}$ receiving circuit; 11, 11B oscillation controller; 12 diversity combining unit; $12_1$ to $12_K$ signal combining unit; 13 decision unit; $13_1$ to $13_K$ signal decision unit; 21 RF processor; 22 frequency converter; $22_1$ to $22_M$ mixer circuit; 23 local oscillator; 24 signal adder; 25, 25B channel-component extractor; 26 channel signal processor; $26_1$ to $26_K$ signal processor; 51 A/D converter (ADC); 52, 52B signal extractor; $52_1$ to $52_K$ filter; $53_1$ to $53_K$ unwanted-signal extractor; 61 time-domain processor; 62 orthogonal transformer; 63 frequency-domain processor; 64 quadrature demodulator; 65, 68, 76 signal separator; 66 local oscillator; 67 deviation compensator; 69 phase shifter; 70, 71 multiplier; 72, 73 low-pass filter (LPF); transmission path estimator; 78 equalizer; 81 time-domain processor; 82 local oscillator; 83 frequency-domain processor; 84 deviation compensator; 90 channel adder; 91 channel product-sum operation unit; $92_1$ to $92_{2N}$ level operation unit; 92 level operation unit; 93 weighting controller; $94_1$ to $94_{2N}$ multiplier; 95 adder.

What is claimed is:

1. A diversity receiving device for receiving, at a first receiving system and a second receiving system, a transmission signal containing first to K-th high-frequency-channel components having mutually different first to K-th central frequencies respectively, K being an integer not less than 2, the diversity receiving device comprising:

a first receiving circuit that receives, as an input, a first received signal obtained at the first receiving system;

a second receiving circuit that receives, as an input, a second received signal obtained at the second receiving system;

a diversity combining unit that combines an output of the first receiving circuit and an output of the second receiving circuit for each same frequency component; and an oscillation controller;

the first receiving circuit including:

a first local oscillator that supplies first to K-th lower-side oscillation-frequency signals having first to K-th lower-side oscillation-frequencies respectively, the first to K-th lower-side oscillation-frequencies being shifted toward lower frequency sides of the first to K-th central frequencies respectively;

a first frequency converter that performs frequency conversion of the first received signal by using the first to K-th lower-side oscillation-frequency signals, thereby generating first to K-th lower-side low-frequency signals corresponding to the first to K-th lower-side oscillation-frequencies respectively;

a first signal adder that adds up the first to K-th lower-side low-frequency signals, thereby generating a first addition signal;

a first channel-component extractor that extracts, from the first addition signal, first to K-th lower-side low-frequency-channel components corresponding to the first to K-th high-frequency-channel components respectively; and a first channel signal processor that performs signal processing of the first to K-th lower-side low-frequency-channel components, thereby generating first to K-th lower-side low-frequency processing signals corresponding to the first to K-th lower-side low-frequency-channel components respectively to output the first to K-th lower-side low-frequency-channel processing signals to the diversity combining unit;

the second receiving circuit including:

a second local oscillator that supplies first to K-th higher-side oscillation-frequency signals having first to K-th higher-side oscillation-frequencies respectively, the first to K-th higher-side oscillation-frequencies being shifted toward higher frequency sides of the first to K-th central frequencies respectively;

a second frequency converter that performs frequency conversion of the second received signal by using the first to K-th higher-side oscillation-frequency signals, thereby generating first to K-th higher-side low-frequency signals corresponding to the first to K-th higher-side oscillation-frequencies respectively;

a second signal adder that adds up the first to K-th higher-side low-frequency signals, thereby generating a second addition signal;

a second channel-component extractor that extracts, from the second addition signal, first to K-th higher-side low-frequency-channel components corresponding to the first to K-th high-frequency-channel components respectively; and a second channel signal processor that performs signal processing of the first to K-th higher-side low-frequency-channel components, thereby generating first to K-th higher-side low-frequency-channel processing signals corresponding to the first to K-th higher-side low-frequency-channel components respectively, and outputs the first to K-th higher-side low-frequency-channel processing signals to the diversity combining unit;

the oscillation controller controlling the first to K-th lower-side oscillation-frequencies so that frequency bands of the first to K-th lower-side low-frequency signals become adjacent to one another and controlling the first to K-th higher-side oscillation-frequencies so that frequency bands of the first to K-th higher-side low-frequency signals become adjacent to one another.

2. The diversity receiving device according to claim 1, wherein:

an absolute-value of a difference between a k-th lower-side oscillation-frequency among the first to K-th lower-side oscillation-frequencies and a k-th central frequency among the first to K-th central frequencies is equal to an absolute-value of a difference between the k-th central frequency and a k-th higher-side oscillation-frequency among the first to K-th higher-side oscillation-frequencies, k being an arbitrary integer; and each of the k-th lower-side low-frequency signal and the k-th higher-side low-frequency signal contains a positive frequency component and a negative frequency component both having a frequency of the absolute-value of the difference.

3. The diversity receiving device according to claim 1, wherein the first channel-component extractor includes:

an A/D converter that converts the first addition signal to a first digital addition signal; and a filter that extracts the first to K-th lower-side low-frequency-channel components from the first digital addition signal; and the second channel-component extractor includes:

an A/D converter that converts the second addition signal to a second digital addition signal; and a filter that extracts the first to K-th higher-side low-frequency-channel components from the second digital addition signal.

4. The diversity receiving device according to claim 1, wherein:
the first receiving circuit further includes a first unwanted-signal extractor that extracts, from the first addition signal, a signal of a frequency band adjacent to frequency bands of the first to K-th lower-side low-frequency-channel components, as a first unwanted signal;
the second receiving circuit further includes a second unwanted-signal extractor that extracts, from the second addition signal, a signal of a frequency band adjacent to frequency bands of the first to K-th higher-side low-frequency-channel components, as a second unwanted signal; and
the oscillation controller controls the first to K-th lower-side oscillation-frequencies and the first to K-th higher-side oscillation-frequencies so as to reduce amplitudes of the first and second unwanted signals.

5. The diversity receiving device according to claim 4, wherein:
the first unwanted-signal extractor detects a signal level of the first unwanted signal;
the second unwanted-signal extractor detects a signal level of the second unwanted signal; and
the oscillation controller controls the first to K-th lower-side oscillation-frequencies and the first to K-th higher-side oscillation-frequencies in accordance with the signal levels detected by the first and second unwanted-signal extractors.

6. The diversity receiving device according to claim 1, wherein:
the first frequency converter has a function to suppress, when the first received signal contains a desired signal component and an image signal component corresponding to the desired signal component, the image signal component contained in the first received signal; and
the second frequency converter has a function to suppress, when the second received signal contains a desired signal component and an image signal component corresponding to the desired signal component, the image signal component contained in the second received signal.

7. The diversity receiving device according to claim 1, wherein:
the first channel signal processor performs quadrature demodulation of each of the first to K-th lower-side low-frequency-channel components by using a first local oscillation signal having a negative frequency, thereby generating an in-phase component and a quadrature component; and
the second channel signal processor performs quadrature demodulation of each of the first to K-th higher-side low-frequency-channel components by using a second local oscillation signal having a positive frequency, thereby generating an in-phase component and a quadrature component.

8. A diversity receiving method for receiving, at a first receiving system and a second receiving system, a transmission signal containing first to K-th high-frequency-channel components having mutually different first to K-th central frequencies respectively, K being an integer not less than 2, the diversity receiving method comprising the steps of:
obtaining a first received signal and a second received signal from the first receiving system and the second receiving system respectively;
performing frequency conversion of the first received signal by using first to K-th lower-side oscillation-frequency signals having first to K-th lower-side oscillation-frequencies respectively, the first to K-th lower-side oscillation-frequencies being shifted toward lower frequency sides of the first to K-th central frequencies respectively, thereby generating first to K-th lower-side low-frequency signals corresponding to the first to K-th lower-side oscillation-frequencies respectively;
adding up the first to K-th lower-side low-frequency signals, thereby generating a first addition signal;
extracting, from the first addition signal, first to K-th lower-side low-frequency-channel components corresponding to the first to K-th high-frequency-channel components respectively;
performing signal processing of the first to K-th lower-side low-frequency-channel components, thereby generating first to K-th lower-side low-frequency-channel processing signals corresponding to the first to K-th lower-side low-frequency-channel components respectively;
performing frequency conversion of the second received signal by using first to K-th higher-side oscillation-frequency signals having first to K-th higher-side oscillation-frequencies respectively, the first to K-th higher-side oscillation-frequencies being shifted toward higher frequency sides of the first to K-th central frequencies respectively, thereby generating first to K-th higher-side low-frequency signals corresponding to the first to K-th higher-side oscillation-frequencies respectively;
adding up the first to K-th higher-side low-frequency signals, thereby generating a second addition signal;
extracting, from the second addition signal, first to K-th higher-side low-frequency-channel components corresponding to the first to K-th high-frequency-channel components respectively;
performing signal processing of the first to K-th higher-side low-frequency-channel components, thereby generating first to K-th higher-side low-frequency-channel processing signals corresponding to the first to K-th higher-side low-frequency-channel components respectively; and
combining the first to K-th lower-side low-frequency-channel processing signals and the first to K-th higher-side low-frequency-channel processing signals for each same frequency component;
the first to K-th lower-side oscillation-frequencies being controlled so that frequency bands of the first to K-th lower-side low-frequency signals become adjacent to one another;
the first to K-th higher-side oscillation-frequencies being controlled so that frequency bands of the first to K-th higher-side low-frequency signals become adjacent to one another.

9. The diversity receiving method according to claim 8, wherein:
an absolute-value of difference between a k-th lower-side oscillation-frequency among the first to K-th lower-side oscillation-frequencies and a k-th central frequency among the first to K-th central frequencies is equal to an absolute-value of difference between the k-th central frequency and a k-th higher-side oscillation-frequency among the first to K-th higher-side oscillation-frequencies, k being an arbitrary integer; and
each of the k-th lower-side low-frequency signal and the k-th higher-side low-frequency signal contains a positive frequency component and a negative frequency component both having a frequency of the absolute-value of difference.

10. The diversity receiving method according to claim 8, further comprising the steps of:
- extracting, from the first addition signal, a signal of a frequency band adjacent to frequency bands of the first to K-th lower-side low-frequency-channel components, as a first unwanted signal;
- extracting, from the second addition signal, a signal of a frequency band adjacent to frequency bands of the first to K-th higher-side low-frequency-channel components, as a second unwanted signal; and
- controlling the first to K-th lower-side oscillation-frequencies and the first to K-th higher-side oscillation-frequencies so as to reduce amplitudes of the first and second unwanted signals.

\* \* \* \* \*